US012568519B2

(12) United States Patent (10) Patent No.: US 12,568,519 B2
Kupanna Subramani et al. (45) Date of Patent: Mar. 3, 2026

(54) METHODS AND APPARATUS FOR RESOURCE SHARING IN THE SIDELINK

(71) Applicant: Huawei Technologies Co., Ltd., Shenzhen (CN)

(72) Inventors: Siva Kupanna Subramani, Arlington Heights, IL (US); Philippe Sartori, Naperville, IL (US); Brian Classon, Palatine, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 18/155,417

(22) Filed: Jan. 17, 2023

(65) Prior Publication Data

US 2023/0156776 A1 May 18, 2023

Related U.S. Application Data

(63) Continuation of application No. PCT/US2020/042598, filed on Jul. 17, 2020.

(51) Int. Cl.
 *H04W 72/566* (2023.01)
 *H04W 72/25* (2023.01)
 *H04W 72/51* (2023.01)

(52) U.S. Cl.
 CPC ......... *H04W 72/566* (2023.01); *H04W 72/25* (2023.01); *H04W 72/51* (2023.01)

(58) Field of Classification Search
 CPC ... H04W 72/566; H04W 72/56; H04W 72/25; H04W 72/20; H04W 72/51; H04W 72/12; H04W 72/512; H04W 8/22
 See application file for complete search history.

(56) References Cited

U.S. PATENT DOCUMENTS

2019/0387377 A1 12/2019 Zhang et al.
2020/0205165 A1 6/2020 Huang et al.

OTHER PUBLICATIONS

Intel Corporation, Design Options to Support Priority for V2V Communication, 3GPP TSG RAN WG1 Meeting #85 R1-164139 Nanjing, China, May 23-27, 2016, 6 pages.
ZTE: "Mode 2 resource allocation schemes on sidelink," 3GPP TSG RAN WG1 #97, Reno, Nevada, US, May 13-17, 2019, R1-1907130, total 7 pages.

*Primary Examiner* — Brian T Le
(74) *Attorney, Agent, or Firm* — Slater Matsil, LLP

(57) ABSTRACT

A method for operating a first communicating device includes sensing an availability of transmission resources; determining a first candidate sidelink resource set in accordance with the availability of transmission resources; and transmitting, to a second communicating device, a sidelink control information (SCI) message comprising a priority indicator indicating a priority associated with the first candidate sidelink resource set and time resource assignments of the first candidate sidelink resource set, the time resource assignments comprising resources reserved by the first communicating device for updating a second candidate sidelink resource set of the second communicating device.

32 Claims, 8 Drawing Sheets

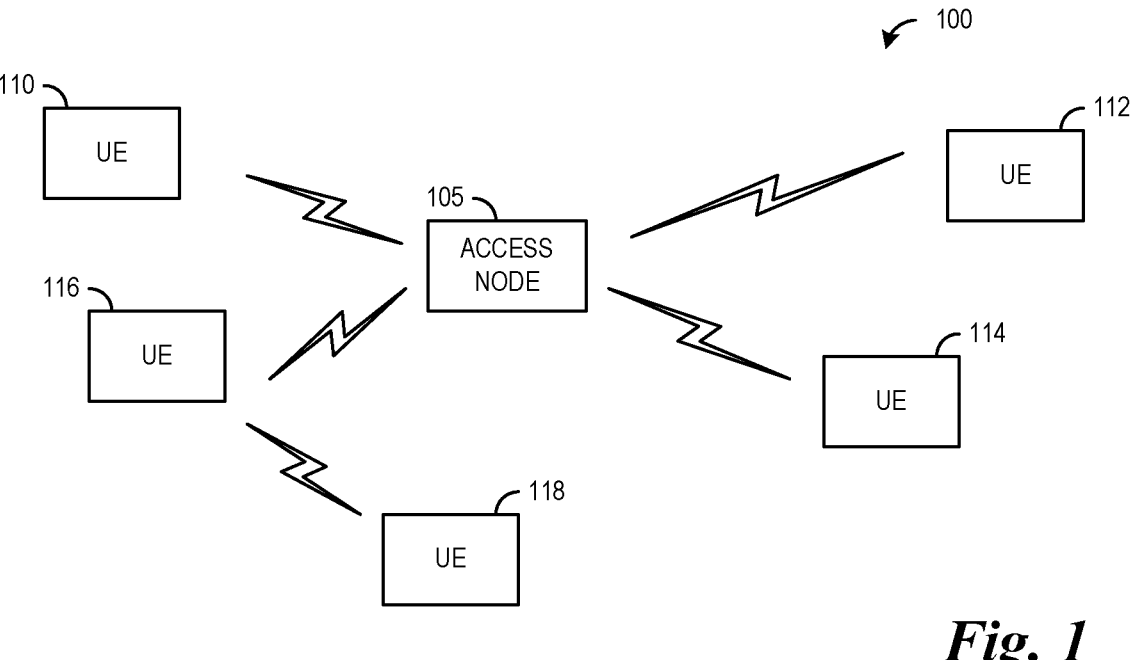
*Fig. 1*
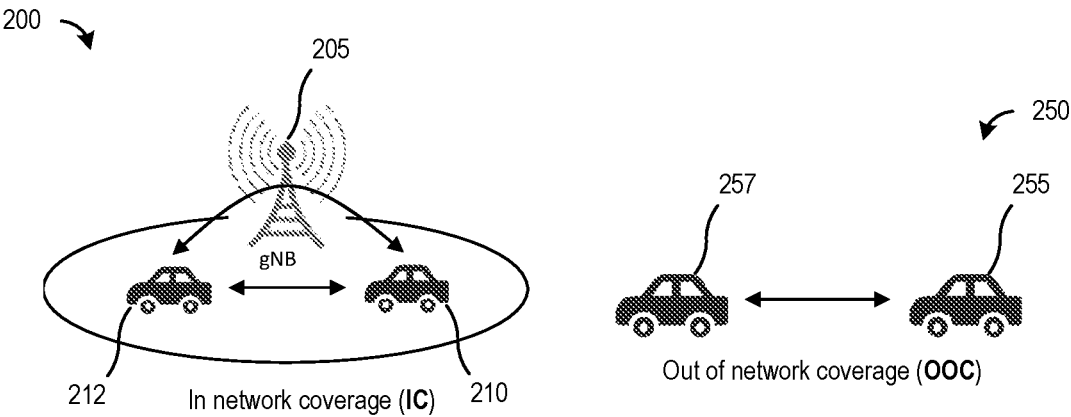
*Fig. 2A*                              *Fig. 2B*

505

500

DCI FORMAT 5A

ITS SPECTRUM

TIME

UE 1
510

UE 2
512

UE 3
514

600

RESOURCE RESERVATION

AVAILABLE
RESOURCES FOR
SELECTION

605

608

609

RESERVED

RESERVED

606

607

RESERVED

RESERVED

610

ITS SPECTRUM

TIME

SLIDING SENSING WINDOW (1S)
620

UE 1     UE 2     UE 3

700

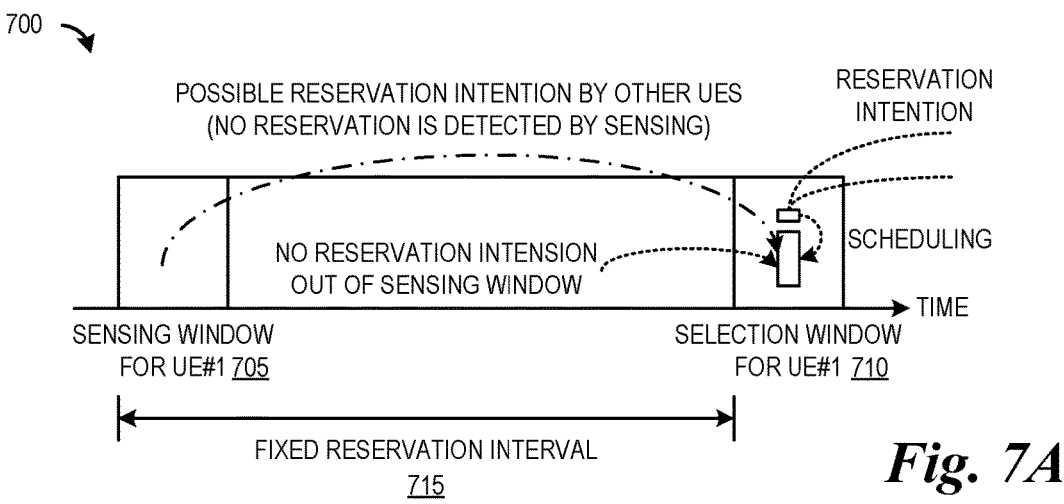

POSSIBLE RESERVATION INTENTION BY OTHER UES
(NO RESERVATION IS DETECTED BY SENSING)

RESERVATION INTENTION

NO RESERVATION INTENSION OUT OF SENSING WINDOW

SCHEDULING

TIME

SENSING WINDOW FOR UE#1 705

SELECTION WINDOW FOR UE#1 710

FIXED RESERVATION INTERVAL 715

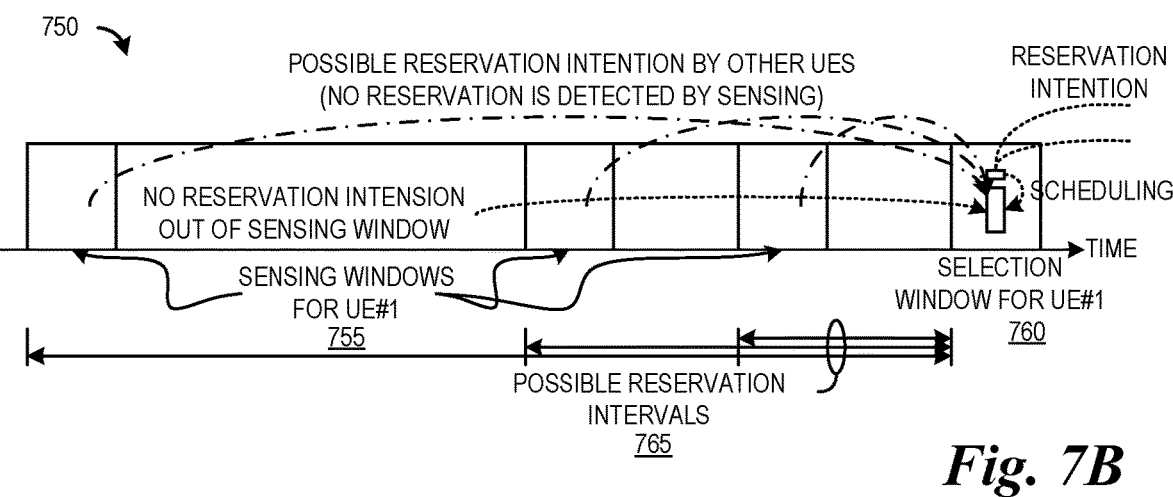

POSSIBLE RESERVATION INTENTION BY OTHER UES
(NO RESERVATION IS DETECTED BY SENSING)

RESERVATION INTENTION

NO RESERVATION INTENSION OUT OF SENSING WINDOW

SCHEDULING

TIME

SENSING WINDOWS FOR UE#1 755

SELECTION WINDOW FOR UE#1 760

POSSIBLE RESERVATION INTERVALS 765

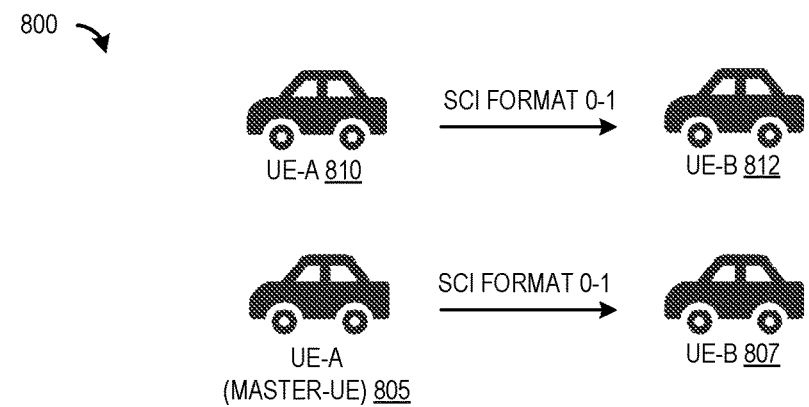

SCI FORMAT 0-1

UE-A 810

UE-B 812

SCI FORMAT 0-1

UE-A (MASTER-UE) 805

METHODS AND APPARATUS FOR RESOURCE SHARING IN THE SIDELINK

CROSS-REFERENCE TO RELATED APPLICATIONS

This application is a continuation of International Application No. PCT/US2020/042598, filed on Jul. 17, 2020, entitled "Methods and Apparatus for Resource Sharing in the Sidelink," application of which is incorporated herein by reference in its entirety.

TECHNICAL FIELD

The present disclosure relates generally to methods and apparatus for digital communications, and, in particular embodiments, to methods and apparatus for resource sharing in the sidelink.

BACKGROUND

The third generation partnership project (3GPP) has been developing and standardizing several important features with fifth generation (5G) new radio access technology (NR). In 3GPP Release-16, RP-190984, a work item for NR vehicle-to-everything (V2X) wireless communication with the goal of providing 5G-compatible high-speed reliable connectivity for vehicular communications was completed. This work item provided the basics of NR sidelink communication for applications such as safety systems and autonomous driving. High data rates, low latencies and high reliabilities are some of the key areas that are being investigated and standardized.

In 3GPP Release-17, work item RP-193257, "New WID on NR Sidelink Enhancement", RAN Plenary Meeting #86, December 2019, which is hereby incorporated herein by reference in its entirety, was approved to further enhance the capabilities of sidelink communication. One of the important objectives of the work item is to introduce UE coordination mechanism where the UE shares resource for the other UEs to use in their resource selection.

SUMMARY

According to a first aspect, a method for operating a first communicating device is provided. The method comprising: sensing, by the first communicating device, an availability of transmission resources; determining, by the first communicating device, a first candidate sidelink resource set in accordance with the availability of transmission resources; and transmitting, by the first communicating device, to a second communicating device, a sidelink control information (SCI) message comprising a priority indicator indicating a priority associated with the first candidate sidelink resource set and time resource assignments of the first candidate sidelink resource set, the time resource assignments comprising resources reserved by the first communicating device for updating a second candidate sidelink resource set of the second communicating device.

In a first implementation form of the method according to the first aspect, the priority indicating that the first communicating device is a high priority device.

In a second implementation form of the method according to the first aspect or any preceding implementation form of the first aspect, the SCI message further comprising a reservation periodicity indicator indicating a reservation periodicity of the first candidate sidelink resource set.

In a third implementation form of the method according to the first aspect or any preceding implementation form of the first aspect, the priority indicator indicating a minimum priority level for the first candidate sidelink resource set.

In a fourth implementation form of the method according to the first aspect or any preceding implementation form of the first aspect, the priority indicator comprising a 3-bit indicator.

In a fifth implementation form of the method according to the first aspect or any preceding implementation form of the first aspect, further comprising transmitting, by the first communicating device, to the second communicating device, a capability indicator indicating capabilities of the first communicating device.

In a sixth implementation form of the method according to the first aspect or any preceding implementation form of the first aspect, the capability indicator being transmitted in at least one of a radio resource control (RRC) message, or a SCI message.

In a seventh implementation form of the method according to the first aspect or any preceding implementation form of the first aspect, the capability indicator further comprising a traffic priority level indicator indicating a traffic priority level to which the capabilities of the second communicating device applies.

According to a second aspect, a method for operating a first communicating device is provided. The method comprising: sensing, by the first communicating device, an availability of transmission resources; determining, by the first communicating device, a first candidate sidelink resource set in accordance with the availability of transmission resources; receiving, by the first communicating device, from a second communicating device, a first sidelink control information (SCI) message comprising a first priority indicator indicating a first priority associated with a second candidate sidelink resource set and time resource assignments of the second candidate sidelink resource set; and updating, by the first communicating device, the first candidate sidelink resource set in accordance with the second candidate sidelink resource set.

In a first implementation form of the method according to the second aspect, the first SCI message further comprising a reservation periodicity indicator indicating a reservation periodicity of the second candidate sidelink resource set.

In a second implementation form of the method according to the second aspect or any preceding implementation form of the second aspect, the first priority indicator indicating a minimum priority level for the second candidate sidelink resource set.

In a third implementation form of the method according to the second aspect or any preceding implementation form of the second aspect, the first priority indicator comprising a 3-bit indicator.

In a fourth implementation form of the method according to the second aspect or any preceding implementation form of the second aspect, the time resource assignments of the second candidate sidelink resource set comprising resources reserved by the first communicating device for coordination.

In a fifth implementation form of the method according to the second aspect or any preceding implementation form of the second aspect, further comprising determining, by the first communicating device, a capability indicator indicating capabilities of the second communicating device.

In a sixth implementation form of the method according to the second aspect or any preceding implementation form of the second aspect, determining the capability indicator comprising at least one of receiving the capability indicator from an access node, receiving the capability indicator in a sidelink radio resource control (RRC) message, retrieving the capability indicator preconfigured in a memory of the first communicating device, or receiving the capability indicator in a SCI message.

In a seventh implementation form of the method according to the second aspect or any preceding implementation form of the second aspect, the capability indicator further comprising a traffic priority level indicator indicating a traffic priority level to which the capabilities of the second communicating device applies.

In an eighth implementation form of the method according to the second aspect or any preceding implementation form of the second aspect, the first priority being applied in accordance with at least one of a first communicating device capability or a first communicating device feature.

In a ninth implementation form of the method according to the second aspect or any preceding implementation form of the second aspect, further comprising: receiving, by the first communicating device, from a third communicating device, a second SCI message comprising a second priority indicator indicating a second priority associated with a third candidate sidelink resource set and time resource assignments of the third candidate sidelink resource set; and updating, by the first communicating device, the first candidate sidelink resource set in accordance with a weighted version of the third candidate sidelink resource set, where updating the first candidate sidelink resource set in accordance with the second candidate sidelink resource set comprising updating the first candidate sidelink resource set in accordance with a weighted version the second candidate sidelink resource set.

According to a third aspect, a first communicating device is provided. The first communication device comprising: one or more processors; and a non-transitory memory storage comprising instructions that, when executed by the one or more processors, cause the first communicating device to: sense an availability of transmission resources; determine a first candidate sidelink resource set in accordance with the availability of transmission resources; and transmit, to a second communicating device, a sidelink control information (SCI) message comprising a priority indicator indicating a priority associated with the first candidate sidelink resource set and time resource assignments of the first candidate sidelink resource set, the time resource assignments comprising resources reserved by the first communicating device for updating a second candidate sidelink resource set of the second communicating device.

In a first implementation form of the first communicating device according to the third aspect, the priority indicating that the first communicating device is a high priority device.

In a second implementation form of the first communicating device according to the third aspect or any preceding implementation form of the third aspect, the SCI message further comprising a reservation periodicity indicator indicating a reservation periodicity of the first candidate sidelink resource set.

In a third implementation form of the first communicating device according to the third aspect or any preceding implementation form of the third aspect, the priority indicator indicating a minimum priority level for the first candidate sidelink resource set.

In a fourth implementation form of the first communicating device according to the third aspect or any preceding implementation form of the third aspect, the instructions further causing the first communicating device to transmit, to the second communicating device, a capability indicator indicating capabilities of the first communicating device.

In a fifth implementation form of the first communicating device according to the third aspect or any preceding implementation form of the third aspect, the capability indicator further comprising a traffic priority level indicator indicating a traffic priority level to which the capabilities of the second communicating device applies.

According to a fourth aspect, a first communicating device is provided. The first communicating device comprising: one or more processors; and a non-transitory memory storage comprising instructions that, when executed by the one or more processors, cause the first communicating device to: sense an availability of transmission resources; determine a first candidate sidelink resource set in accordance with the availability of transmission resources; receive, from a second communicating device, a first sidelink control information (SCI) message comprising a first priority indicator indicating a first priority associated with a second candidate sidelink resource set and time resource assignments of the second candidate sidelink resource set; and update the first candidate sidelink resource set in accordance with the second candidate sidelink resource set.

In a first implementation form of the first communicating device according to the fourth aspect, the first SCI message further comprising a reservation periodicity indicator indicating a reservation periodicity of the second candidate sidelink resource set.

In a second implementation form of the first communicating device according to the fourth aspect or any preceding implementation form of the fourth aspect, the first priority indicator indicating a minimum priority level for the second candidate sidelink resource set.

In a third implementation form of the first communicating device according to the fourth aspect or any preceding implementation form of the fourth aspect, the time resource assignments of the second candidate sidelink resource set comprising resources reserved by the first communicating device for coordination.

In a fourth implementation form of the first communicating device according to the fourth aspect or any preceding implementation form of the fourth aspect, the instructions further causing the first communicating device to determine a capability indicator indicating capabilities of the second communicating device.

In a fifth implementation form of the first communicating device according to the fourth aspect or any preceding implementation form of the fourth aspect, the instructions further causing the first communicating device to, at least one of, receive the capability indicator from an access node, receive the capability indicator in a sidelink radio resource control (RRC) message, retrieve the capability indicator preconfigured in a memory of the first communicating device, or receive the capability indicator in a SCI message.

In a sixth implementation form of the first communicating device according to the fourth aspect or any preceding implementation form of the fourth aspect, the capability indicator further comprising a traffic priority level indicator indicating a traffic priority level to which the capabilities of the second communicating device applies.

In a seventh implementation form of the first communicating device according to the fourth aspect or any preceding implementation form of the fourth aspect, the instructions further causing the first communicating device to receive, from a third communicating device, a second SCI message comprising a second priority indicator indicating a second priority associated with a third candidate sidelink resource set and time resource assignments of the third candidate sidelink resource set; and update the first candidate sidelink resource set in accordance with a weighted version of the third candidate sidelink resource set, where updating the first candidate sidelink resource set in accordance with the second candidate sidelink resource set comprising updating the first candidate sidelink resource set in accordance with a weighted version the second candidate sidelink resource set.

An advantage of a preferred embodiment is that resource information measured at a first device is provided to a second device to help the second device select resources to use for its own transmission.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 1 illustrates an example communications system;

FIG. 2A illustrates a communication system highlighting in-coverage operation;

FIG. 2B illustrates a communication system highlighting out-of-coverage operation;

FIG. 7A illustrate example spectrum highlighting a sensing window with fixed reservation interval;

FIG. 7B illustrates example spectrum highlighting sensing windows with multiple reservation intervals;

FIG. 8 illustrates a diagram of an example communication system highlighting the transmission of the set of resources by a UE-A or a master UE according to example embodiments presented herein;

DETAILED DESCRIPTION OF ILLUSTRATIVE EMBODIMENTS

Figure 3:
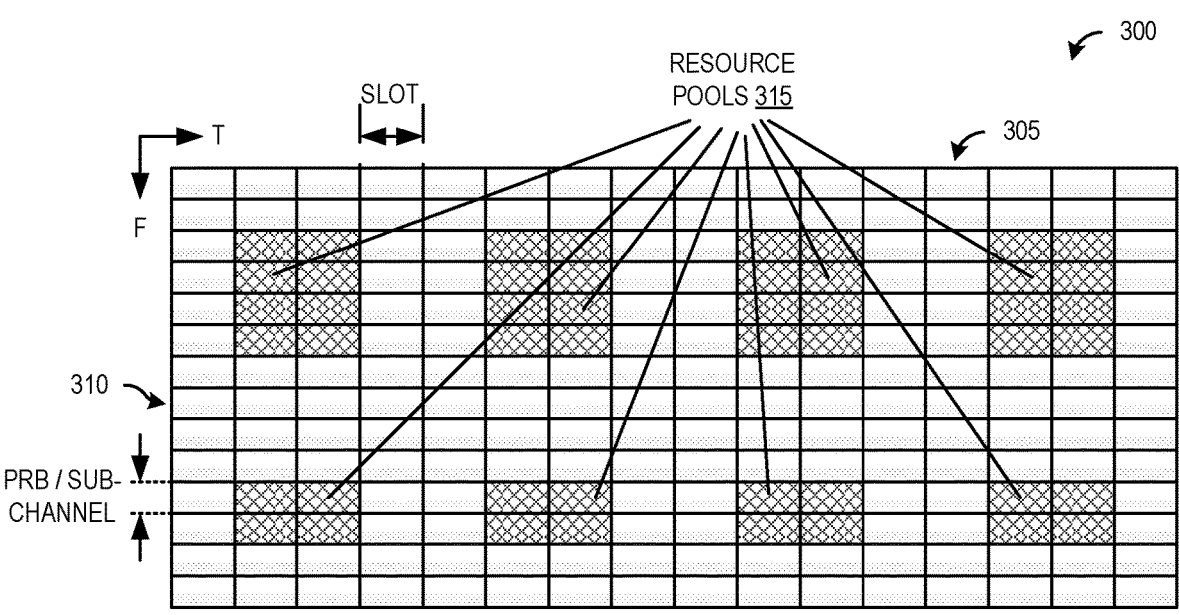
FIG. 3 illustrates an example frame structure highlighting a resource pool.

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

FIG. 1 illustrates an example communications system 100. Communications system boo includes an access node 105 serving user equipments (UEs), such as UEs 110, 112, 114, 116, and 118. In a first operating mode, communications to and from a UE passes through access node 105. In a second operating mode, communications to and from a UE do not pass through access node 105, however, access node 105 typically allocates resources used by the UE to communicate when specific conditions are met. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and five UEs are illustrated for simplicity.

Communication can either be in-coverage, or out-of-coverage: with in-coverage (IC) operation, a central node (eNB, gNB) is present and can be used to manage the sidelink. FIG. 2A illustrates a communication system 200 highlighting IC operation. Communication system 200 includes a gNB 205 managing sidelink communications between UEs 210 and 212. With out-of-coverage (OOC) operation, the system operation is fully distributed, and UEs select resources on their own. FIG. 2B illustrates a communication system 250 highlighting OOC operation. Communication system 250 includes UEs 255 and 257 participating in sidelink communications without gNB intervention.

For the purpose of sidelink communications, the notion of resource pools (RPs) was introduced for the LTE sidelink, and is being reused for NR sidelink. A RP is a set of resources that can be used for sidelink communication. Resources in a RP are configured for different channels including control channels (such as physical sidelink control channels (PSCCH)), shared channels (including physical sidelink shared channels (PSSCH)), feedback channels (e.g., physical sidelink feedback channels (PSFCH)), synchronization signals (for example, primary sidelink synchronization signals (PSSS), secondary sidelink synchronization signals (SSSS), etc.), reference signals (e.g., demodulation reference signals (DMRS)), broadcast channels (including physical sidelink broadcast channels (PSBCH) (e.g. master information block (MIB)), channel state information (CSI), and so on.

In general, a RP for the sidelink may be configured in units of slots in the time domain and physical resource blocks (PRBs) or sub-channels in the frequency domain. A sub-channel consists of one or more PRBs. FIG. 3 illustrates an example frame structure 300 highlighting a RP. Frame structure 300 includes time resources, such as slots 305, and frequency resources, such as PRBs or sub-channels 310. RPs may be defined from resources of frame structure 300. Example RP 315 is shown in FIG. 3. The technical standard defines rules on how the resources are shared and used for a particular configuration of the RP.

Figure 4:
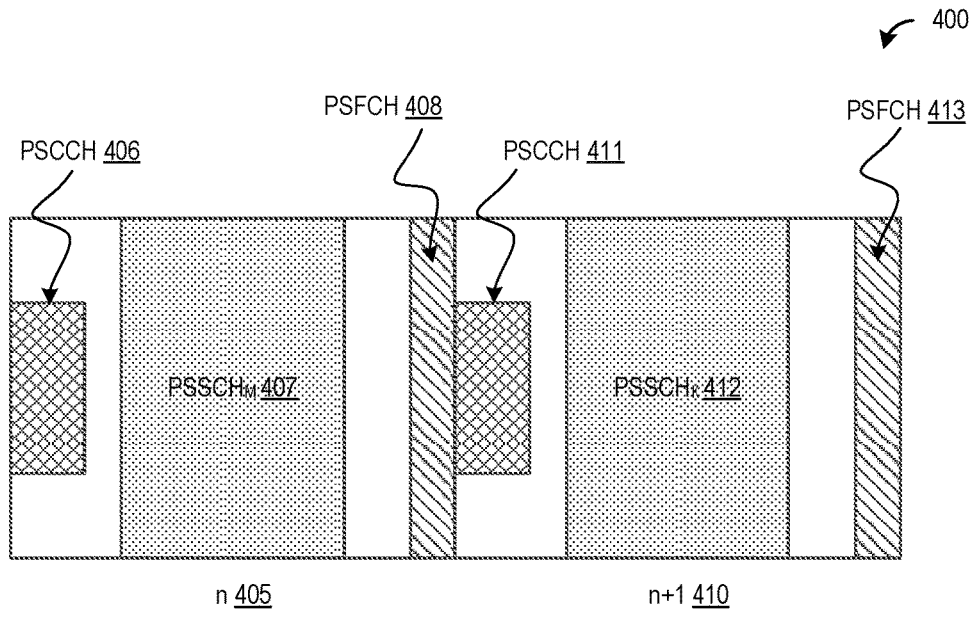
FIG. 4 illustrates an example resource grid of slots with channel assignments.

FIG. 4 illustrates an example resource grid 400 of slots with channel assignments. As shown in FIG. 4, resource grid 400 includes slot n 405 and slot n+1 407. Slot n 405 includes resources allocated for sidelink channels: PSCCH 406, $PSSCH_M$ 407, and PSFCH 408, and slot n+1 410 includes resources allocated for sidelink channels: PSCCH 411, PSS-$CH_K$ 412, and PSFCH 413.

In the case of NR mobile broadband (MBB), each PRB in the resource grid is defined as a slot of 14 consecutive orthogonal frequency division multiplexed (OFDM) symbols in the time domain and 12 consecutive subcarriers in the frequency domain. In other words, each resource block contains 12×14 resource elements (REs). When used as a frequency domain unit, a PRB comprises 12 consecutive subcarriers. There are 14 symbols in a slot when a normal cyclic prefix is used and 12 symbols in a slot when an extended cyclic prefix is used. The duration of a symbol is inversely proportional to the subcarrier spacing (SCS). For a {15, 30, 60, or 120} kHz SCS, the duration of a slot is {1, 0.5, 0.25, or 0.125} ms, respectively. Each PRB may be allocated to combinations of a control channel, a shared channel, a feedback channel, reference signals, and so on. In addition, some REs of a PRB may be reserved. A similar structure is used on the sidelink as well. A communication resource may be a PRB, a set of PRBs, a code (if CDMA is used, similarly as for the PUCCH), a physical sequence, a set of REs, and so on.

$$\left\lceil \log_2\left(\frac{N_{subChannel}^{SL}\left(N_{subChannel}^{SL} + 1\right)}{2}\right)\right\rceil$$

$$\left\lceil \log_2\left(\frac{N_{subChannel}^{SL}\left(N_{subChannel}^{SL} + 1\right)\left(2N_{subChannel}^{SL} + 1\right)}{6}\right)\right\rceil\left\lceil \log_2(N_{reservPeriod})\right\rceil$$

Sidelink control information (SCI) format 1-A may be used for scheduling PSSCHs. In particular, the format is used for the scheduling of PSSCHs and 2nd-stage-SCI on PSSCHs. The information transmitted by the SCI format 1-A is as follows:

$$\left\lceil \log_2\left(\frac{N_{subChannel}^{SL}\left(N_{subChannel}^{SL} + 1\right)}{2}\right)\right\rceil$$

$$\left\lceil \log_2\left(\frac{N_{subChannel}^{SL}\left(N_{subChannel}^{SL} + 1\right)\left(2N_{subChannel}^{SL} + 1\right)}{6}\right)\right\rceil\left\lceil \log_2(N_{reservPeriod})\right\rceil$$

Priority—3 bits as defined in TS 38.214;

$$\left\lceil \log_2\left(\frac{N_{subChannel}^{SL}\left(N_{subChannel}^{SL} + 1\right)}{2}\right)\right\rceil$$

$$\left\lceil \log_2\left(\frac{N_{subChannel}^{SL}\left(N_{subChannel}^{SL} + 1\right)\left(2N_{subChannel}^{SL} + 1\right)}{6}\right)\right\rceil\left\lceil \log_2(N_{reservPeriod})\right\rceil$$

Frequency resource assignment—bits when the value of the higher layer parameter maxNumResource is configured to 2; otherwise bits when the value of the higher layer parameter maxNumResource is configured to 3, as defined in TS 38.214;

$$\left\lceil \log_2\left(\frac{N_{subChannel}^{SL}\left(N_{subChannel}^{SL} + 1\right)}{2}\right)\right\rceil$$

$$\left\lceil \log_2\left(\frac{N_{subChannel}^{SL}\left(N_{subChannel}^{SL} + 1\right)\left(2N_{subChannel}^{SL} + 1\right)}{6}\right)\right\rceil\left\lceil \log_2(N_{reservPeriod})\right\rceil$$

Time resource assignment—5 bits when the value of the higher layer parameter maxNumResource is configured to 2; otherwise 9 bits when the value of the higher layer parameter maxNumResource is configured to 3, as defined in TS 38.214;

$$\left\lceil \log_2\left(\frac{N_{subChannel}^{SL}\left(N_{subChannel}^{SL} + 1\right)}{2}\right)\right\rceil$$

$$\left\lceil \log_2\left(\frac{N_{subChannel}^{SL}\left(N_{subChannel}^{SL} + 1\right)\left(2N_{subChannel}^{SL} + 1\right)}{6}\right)\right\rceil\left\lceil \log_2(N_{reservPeriod})\right\rceil$$

Resource reservation period—bits as defined in TS 38.214, if higher parameter reserveResourceDifferentTB is configured; 0 bit otherwise;

$$\left\lceil \log_2\left(\frac{N_{subChannel}^{SL}\left(N_{subChannel}^{SL} + 1\right)}{2}\right)\right\rceil$$

$$\left\lceil \log_2\left(\frac{N_{subChannel}^{SL}\left(N_{subChannel}^{SL} + 1\right)\left(2N_{subChannel}^{SL} + 1\right)}{6}\right)\right\rceil\left\lceil \log_2(N_{reservPeriod})\right\rceil$$

Demodulation reference signal (DMRS) pattern—[x] bits as defined in TS 38.214, if more than one DMRS patterns are configured by higher layer parameter TimePatternPsschDmrs; 0 bit otherwise;

$$\left\lceil \log_2\left(\frac{N_{subChannel}^{SL}\left(N_{subChannel}^{SL} + 1\right)}{2}\right)\right\rceil$$

$$\left\lceil \log_2\left(\frac{N_{subChannel}^{SL}\left(N_{subChannel}^{SL} + 1\right)\left(2N_{subChannel}^{SL} + 1\right)}{6}\right)\right\rceil\left\lceil \log_2(N_{reservPeriod})\right\rceil$$

2nd-stage SCI format—[x] bits as defined in TS 38.214;

$$\left\lceil \log_2\left(\frac{N_{subChannel}^{SL}\left(N_{subChannel}^{SL} + 1\right)}{2}\right)\right\rceil$$

$$\left\lceil \log_2\left(\frac{N_{subChannel}^{SL}\left(N_{subChannel}^{SL} + 1\right)\left(2N_{subChannel}^{SL} + 1\right)}{6}\right)\right\rceil\left\lceil \log_2(N_{reservPeriod})\right\rceil$$

Beta_offset indicator—[2] bits as defined in TS 38.214;

$$\left\lceil \log_2\left(\frac{N_{subChannel}^{SL}\left(N_{subChannel}^{SL} + 1\right)}{2}\right)\right\rceil$$

$$\left\lceil \log_2\left(\frac{N_{subChannel}^{SL}\left(N_{subChannel}^{SL} + 1\right)\left(2N_{subChannel}^{SL} + 1\right)}{6}\right)\right\rceil\left\lceil \log_2(N_{reservPeriod})\right\rceil$$

Number of DMRS port—1 bit as defined in TS 38.214;

$$\left\lceil \log_2\left(\frac{N_{subChannel}^{SL}\left(N_{subChannel}^{SL} + 1\right)}{2}\right)\right\rceil$$

-continued $$\left\lceil \log_2\left(\frac{N_{subChannel}^{SL}\left(N_{subChannel}^{SL}+1\right)\left(2N_{subChannel}^{SL}+1\right)}{6}\right)\right\rceil\left\lceil\log_2(N_{reservPeriod})\right\rceil$$

Modulation and coding scheme (MCS)—5 bits as defined in TS 38.214; and $$\left\lceil\log_2\left(\frac{N_{subChannel}^{SL}\left(N_{subChannel}^{SL}+1\right)}{2}\right)\right\rceil$$

$$\left\lceil\log_2\left(\frac{N_{subChannel}^{SL}\left(N_{subChannel}^{SL}+1\right)\left(2N_{subChannel}^{SL}+1\right)}{6}\right)\right\rceil\left\lceil\log_2(N_{reservPeriod})\right\rceil$$

Reserved—[2-4] bits as determined by higher layer parameter, with value set to zero.

In NR, there are two defined communications modes:

Mode-1 communication, where the gNB manages the sidelink (resource allocation, etc.). In mode-1, the transmitting UE is expected to receive its resource allocation from the gNB (e.g., through a DCI or a configured grant).

Mode-2 communication, where the transmitting UEs autonomously select resources. For mode-2, resources are selected using sensing (measuring energy in resources).

Table 1 presents a comparison of characteristics of mode-1 and mode-2 communications.

TABLE 1

Mode-1 and Mode-2 characteristics comparison.

|  | Mode-1 | Mode-2 |
|---|---|---|
| Scheduling | Performed by gNB | Performed by UE (sensing) |
| Spectrum | Shared or dedicated | Shared or dedicated |
| Interference control | Interference is minimized (at the expense of a centralized controller) | Interference is avoided (through sensing) |
| Congestion control | Performed by gNB and UE | Performed by UE only |
| Synchronization | gNB or Global Navigation Satellite System (GNSS) | gNB or GNSS or UE |

In LTE, there is a mode-3 sidelink communication mode that has significant commonalities with NR sidelink mode-1 communication. The resource allocation is performed as follows:

A UE requests transmission resources from an eNodeB;

An eNB semi-persistently or dynamically schedules to support periodical or non-periodical V2X messages; and With eNB scheduling, interference can be controlled (i.e., no collision).

Figure 5:
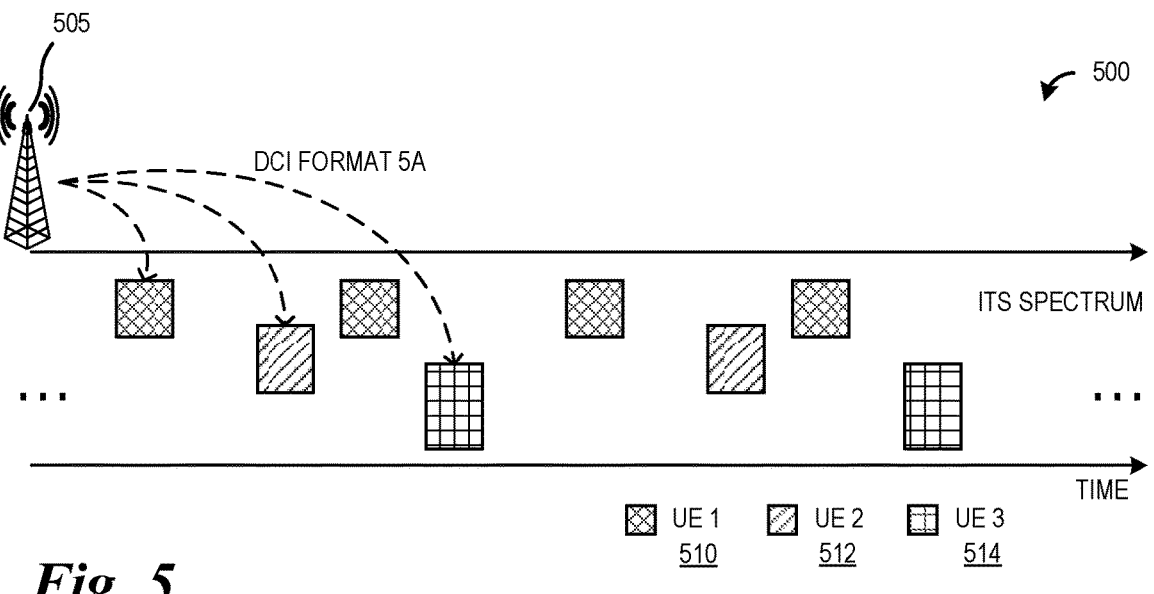
FIG. 5 illustrates a communication system highlighting LTE mode-3 sidelink communication.

FIG. 5 illustrates a communication system 500 highlighting LTE mode-3 sidelink communication. Communication system 500 includes an eNB 500 allocating resources for UEs 510, 512, and 514. eNB 500 semi-persistently or dynamically schedules resources to support periodical or non-periodical V2X messages. eNB 500 transmits scheduling information about the allocated resources to the UEs using DCI format 5A. The scheduled resources are shown in FIG. 5 as cross-hatched boxes.

LTE mode-4 sidelink communication mode has significant commonalities with NR sidelink mode-2 communication. The resource allocation is performed as follows (using sensing and reservations):

Sliding sensing window: A UE keeps decoding other UEs' scheduling assignment (SA) in the SCI and measures corresponding PSSCH energy (sensing);

Step 1: Collect sensing information with PSSCH energy measurement;

Step 2: Exclude high-energy resources, form candidate resource set;

Step 3: Select transmit (Tx) resource from the candidate resource set; and

Step 4: Transmit on the selected resources semi-persistently matching the traffic generation interval.

Figure 6:
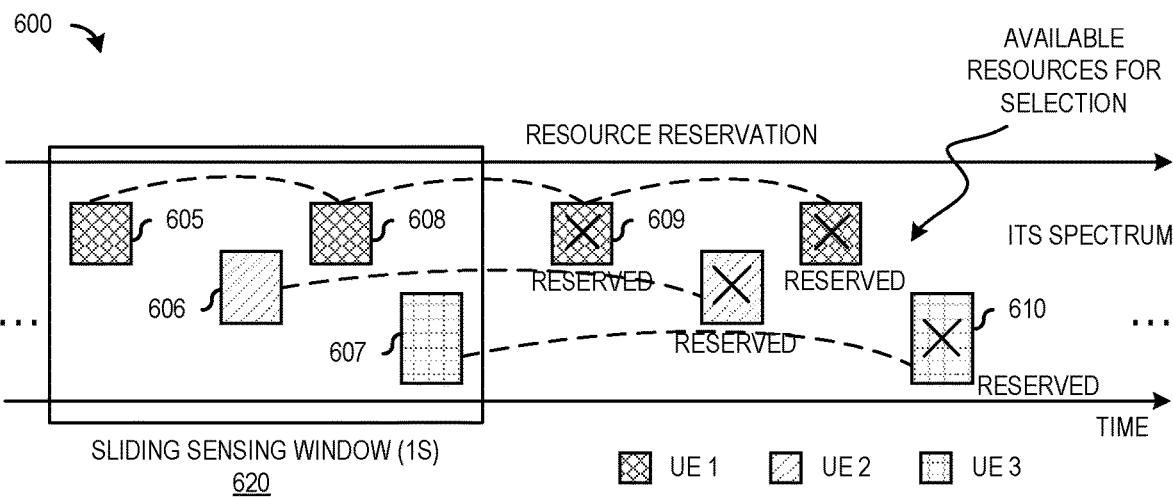
FIG. 6 illustrates an example communication system spectrum highlighting sensing operation.

FIG. 6 illustrates an example communication system spectrum 600 highlighting sensing operation. Spectrum 600 includes resources 605-610 that are used for transmissions. A UE senses spectrum 600 in sliding window 620. As shown in FIG. 6, sliding window 620 is a one second duration sliding window, but other durations may be used. Within sliding window 620, the UE is able to sense energy in resources 605-608. As a result, the UE identifies resources associated with the identified resources (resources 605-608) as being reserved (including but not limited to resources 609 and 610). The UE excludes the reserved resources from its candidate resource set.

In order to reduce power consumption, partial sensing can be used. In partial sensing, the UE does not sense for the full sliding sensing window (e.g., the entire one second duration), but senses the spectrum for only a subset of the sliding sensing window. As explained in R1-167886, two possible partial sensing mechanisms can be defined:

Sensing window with fixed reservation interval, where the UE senses one block of consecutive resources within the full sliding window (e.g., looms out of the one second duration, but other values are possible). FIG. 7A illustrate example spectrum 700 highlighting a sensing window with fixed reservation interval. A UE senses a block of consecutive resources within the full sliding sensing window (e.g., sensing window 705), and based on the sensing results, the UE reserves resources in a selection window a fixed reservation interval 715 from the block of consecutive resources (e.g., selection window 710).

Sensing window with multiple reservation intervals, where the UE senses multiple blocks of consecutive resources within the full sliding window (e.g., 10 sub-windows of toms each within the one second duration sensing window, but other values are possible). FIG. 7B illustrates example spectrum 750 highlighting sensing windows with multiple reservation intervals. A UE senses multiple blocks of consecutive resources within the full sliding sensing window (e.g., sensing windows 755), and based on the sensing results, the UE reserves resources in a selection window with multiple reservation intervals 765 from the multiple blocks of consecutive resources (e.g., selection window 760).

In 3GPP Release-16, NR sidelink communication between devices, such as UEs, was introduced. Sidelink communication is an addition to typical downlink and uplink communication. Sidelink-capable UEs would regularly exchange control or data information with other sidelink-capable UEs. Furthermore, a 3GPP Release-17 work item RP-193257 was agreed upon with the following objective:

Study the feasibility and benefit of the enhancement(s) in mode-2 for enhanced reliability and reduced latency in consideration of both packet reception ratio (PRR) and packet inter-reception ratio (PIR) as defined in TR 370.885, as well as specify the identified solution if deemed feasible and beneficial.

Inter-UE coordination with the following (until RAN #88) a set of resources is determined at UE-A. This set is sent to UE-B in mode-2 and UE-B takes this into account in the resource selection for its own transmission.

The 3GPP Release-16 NR V2X signaling does not provide a mechanism to fulfill this objective.

According to an example embodiment, methods and apparatus are provided for signaling a set of resources or an indication of a set of resources by a first UE and taking the indication into account, at a second UE, while performing resource selection for a transmission at the second UE. In a diverse system of sidelink-enabled UEs, it is recognized that the UEs will have different capabilities or features. Even in situations where the UEs have similar capabilities or features, it may be possible that some UEs are positioned to lead or initiate the communication and share more critical information than other UEs. This leads to a momentary difference in capability or priority. Furthermore, existing SCI signaling does not handle the exchanging sets of resources, except in the narrow case of the resource grant that the UE is currently using. In the discussion presented below, signaling a set of resources and signaling an indication of a set of resources are used interchangeably. In a situation where explicit differentiation is needed, the appropriate wording will be used. The terms capability and feature are used interchangeably in the discussion presented herein without loss of generality.

Example embodiments presented herein provide for the following:

Distinction is made between sidelink-enabled UEs that do or do not support the techniques presented herein. In existing systems, any resource schedule or coordination message shared or exchanged between 3GPP Release-16 NR V2X UEs are considered without differentiation, meaning that when messages arrives at a UE without priority indications, then all messages carry the same weight. If UE-UE coordination is implemented in 3GPP Release-17 without any capability or priority fields, the resource or coordination messages will be treated without differentiation.

UEs will be able to indicate capability, or qualitative measure or accuracy of resource schedule information. The UEs that are transmitting or sharing a resource schedule are currently unable to indicate their capability, nor indicate the qualitative measure or accuracy of resource schedule information.

UEs will be indicated whether the shared resource schedule is a suggestion or an instruction. The UEs are currently not provided with an explicit indication whether the shared resource schedule is suggestive or instructive, on par with a mode-1 grant.

In the discussion presented below, the following situation is used: UE-As (a first type of UEs) are in the transmitting mode, particularly in the context of sharing resource information; Master UEs are a subset of UE-As that have better resource information and are sufficiently suited to sharing the resource information; Master UEs may also be a subset of UE-As that have higher priority; UE-Bs (a second type of UEs) are in the receiving mode, particularly in the context of receiving resource information; and UE-Bs may also be UEs having lower priority, when compared to master UEs, for example.

In an embodiment, a random resource selection procedure for a master UE is provided. Also provided is a procedure for sharing the resource selection information. The master UE that is performing the initial resource selection may have several motivating factors, including: i) sharing the resource schedule information that it obtains; ii) partially sharing the resource schedule information that it obtains; and iii) sharing the resource schedule information only and do not make use of the resource schedule information.

In 3GPP Release-17, the UE-A senses the spectrum for the entirety of the sensing window period. The UE-A that is designated as the master UE performs the sensing multiple times (as compared to once for regular 3GPP Release-16 UEs). In 3GPP Release-17, T_o is an internal parameter defined in number of slots, and the sensing window is defined from To_SensingWindow. The multiple or longer duration of sensing may be applicable to consecutive or non-contiguous periods. The process enables the sensing or resource selection of the master UE to be on par or better than other UE-As. An optional step involves the UE-A sets a SCI field to indicate that it is the master UE. Processes involved with determining master UEs, along with a discussion of the hierarchy of UEs is not presented herein. Existing techniques may be used to determine master UEs, for instance, the master UEs may be pre-configured.

In an embodiment, the master UE also provides UE-specific or, at least, directional resource sensing and sharing. This may be enabled by the master UE having additional capabilities, such as directionality supported by multiple antennas.

In an embodiment, methods and apparatus for distinguishing UE capabilities are provided. In a situation where UEs have different capabilities, there is a need for the UEs to indicate their capabilities to other UEs. Even in situations when the UEs have similar or same capabilities, the UEs may function differently whether they are operating in transmit or receive mode. The method and apparatus may also be used to distinguish associated conditions.

In an embodiment, methods and apparatus for distinguishing UE capabilities between a UE that transmits the set of resources and the UE that receives the set of resources are provided. The UE transmitting the set of resources may be a UE-A or a master UE. The UE receiving the set of resources may be a UE-B.

In an embodiment, the transmission of the set of resources is performed using SCI format 1-A. FIG. 8 illustrates a diagram of an example communication system Boo highlighting the transmission of the set of resources by a UE-A or a master UE. A master UE 805 transmits the set of resources to UE-B 807 using SCI format 1-A. A UE-A 810 transmits the set of resources to UE-B 812 using SCI format 1-A. Although the example embodiments are presented and discussed in the context of SCI format 1-A (as well as formats 2-A and 2B), the example embodiments are operable with other SCI formats. Furthermore, SCI formats 1-A, 2A, and 2-B are the names given to particular message formats under 3GPP Release 16. The message format may be given a different name in subsequent releases. Therefore, the use of SCI formats 1-A, 2A, and 2-B should not be construed as being limiting to the scope of the example embodiments.

In an embodiment, methods and apparatus for distinguishing a master UE is provided. As discussed previously, a master UE is a UE-A but is capable of providing qualitatively different resource information from other UE-As. As an example, a master UE may have different UE capabilities from other UE-As. As another example, a master UE may have higher priority from other UE-As.

Example characteristics of a master UE include: 1) more time sensing; 2) directional; 3) share UE-specific or directional resource information; 4) distinguishes itself when transmitting SCI information. The distinguishing information may be one or a combination of the characteristics.

In order to be supported, a new UE capability is introduced to indicate that the UE is a master UE. Embodiments include:

Option 1: Binary capability. If set to a first value (e.g., 0), then the UE is a master UE. If set to a second value (e.g., 1) then the UE is a slave UE (i.e., a regular UE-A). This capability is set from the transmitting UE, e.g., the UE-A.

Option 2: Hierarchical rank capability. An extension of option 1, but more than one value is possible. The resource information is taken into account depending upon the hierarchical rank capability value. As an example, in a public safety deployment, UEs from central command have the highest hierarchical rank capability, a firefighter truck leader has a somewhat lower capability, a squad leader would have a yet lower capability, and a regular firefighter would have the lowest rank capability.

Option 3: Capability to indicate resources used for UE coordination. In this option, the UE indicates that it has the capability to indicate resources that it wants to remain free. However, what actions to take may be left up to the UE receiving the resource information. It may not be mandated to use the resources. Option 3 may be used jointly with either of Options 1 or 2.

Table 2 displays an example UE capability for Option 1. Example UE capabilities for Options 2 and 3 may be similar.

TABLE 2

| Example UE capability for Option 1 | |
| --- | --- |
| Index | 15-X |
| Feature group | Whether the UE can support coordination |
| Components | 1) Whether UE is a master UE or not |
| | 2) Whether the UE supports sending set of resources to other UEs |
| Prerequisite feature groups | |
| Need for the gNB to know if the feature is supported | Yes |
| Applicable to the capability signalling exchange between UEs (V2X WI only)". | Yes |
| Consequence if the feature is not supported by the UE | UE cannot support UE coordination |
| Type - (the 'type' definition from UE features should be based on the granularity of 1) Per UE or 2) Per Band or 3) Per BC or 4) Per FS or 5) Per FSPC) | Per UE |
| Need of FDD/TDD differentiation | No |
| Need of FR1/FR2 differentiation | No |
| Capability interpretation for mixture of FDD/TDD and/or FR1/FR2 | Support mixture of FDD/TDD and/or FR1/FR2 |
| Note | |
| Mandatory/Optional | Optional with capability signalling |

In an embodiment, the fields of SCI format 1-A and SCI format 2-A or 2-B (the first stage SCI and the second stage SCI) are updated to include the characteristics of UE-A and master UE.

In an embodiment, methods and apparatus are provided for a UE-B when the UE-B receives SCI and determines resources. When the UE-B receives the SCI format 1-A message with sensing resource allocation, and when the UE-B is indicated by a SCI format field that the resource allocation is from a master UE, the UE-B may:

Apply the received resource information. This is similar to a mode-1 grant.

Apply a weight to the received resource information and combines the weighted resource information with existing resource information.

In a situation where the UE-B receives resource information from multiple sources (more than one UE-A), UE-B applies weights to the received information depending on factors, such as a signal strength metric (e.g., layer 1 reference signal received power (L1-RSRP), sidelink synchronization signal block (S-SSB) if a UE transmits an S-SSB as a synchronization source, and so on), or distance (such as distances between UE-B and the multiple UE-As, including whether UE-A is considered to be in range to provide a distance based NACK if so configured). The weight applied to the received information may also be an identity weight so that the received information is unchanged by the weight. In such a situation, combining weighted received information that has been weighted by the identity weight is related to signal strength, and so on. The weighted information may be combined using one or more combining operations, such as selecting a superset of the weighted information, selecting one of the sets of the weighted information (as an example, the set with the greatest or largest weights), selecting the weighted information common to the sets of weighted information, selecting an intersection of information present in the sets of weighted information, and so forth. In an embodiment, the weighted information may be combined in situations when the signal strength meets a signal strength threshold, the distance between the UEs meets a distance threshold, and so on. In an embodiment, the received information from a first set of UEs is applied to update UE-B's resource information, while the received information from a second set of UEs may be applied to update UE-B's resource information, where a differentiation between the first set of UEs and the second set of UEs may be based on the priority or capabilities of the UEs.

In an embodiment, a timing of the updates to the candidate resource set and a frequency of the updates are based on the SCI format 1-A message and a time resource assignment field included in the SCI format 1-A message. As an example, the UE-B may be configured to always follow the instruction of the master UE. As another example, the UE-B may be configured to behave according to priority rules.

Figure 9:
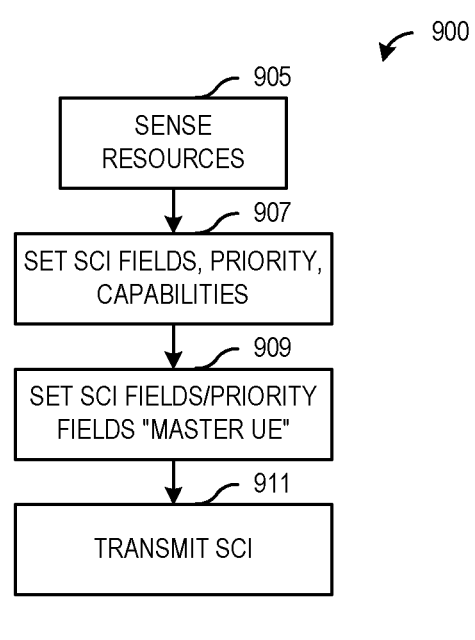
FIG. 9 illustrates a flow diagram of example operations occurring in a UE-A performing sensing and transmitting resource information according to example embodiments presented herein.

FIG. 9 illustrates a flow diagram of example operations 900 occurring in a UE-A performing sensing and transmitting resource information. Operations 900 may be indicative of operations occurring in a UE-A as the UE-A performing sensing and transmitting resource information.

Operations 900 begin with the UE-A sensing resources (block 905). The UE-A senses resources for a duration of a sensing window or one or more portions of a sensing window as described previously. The UE-A may detect energy levels associated with the resources, for example. If a resource has a high energy level, the UE-A may determine that there is a transmission occurring in the resource and that the resource is unavailable. The UE-A sets SCI fields, priority, and capabilities (block 907). The UE-A sets the SCI fields, priority, and capabilities in accordance with the results of the sensing of the resources, its own priority and capabilities. The UE-A sets the SCI fields or priority fields to indicate that UE-A is the master UE (block 909). The UE-A may indicate that it is the master UE utilizing one or more of the options presented above, for example. The UE-A transmits the SCI (block 911). The SCI is transmitted in SCI format 1-A, for example.

Figure 10:
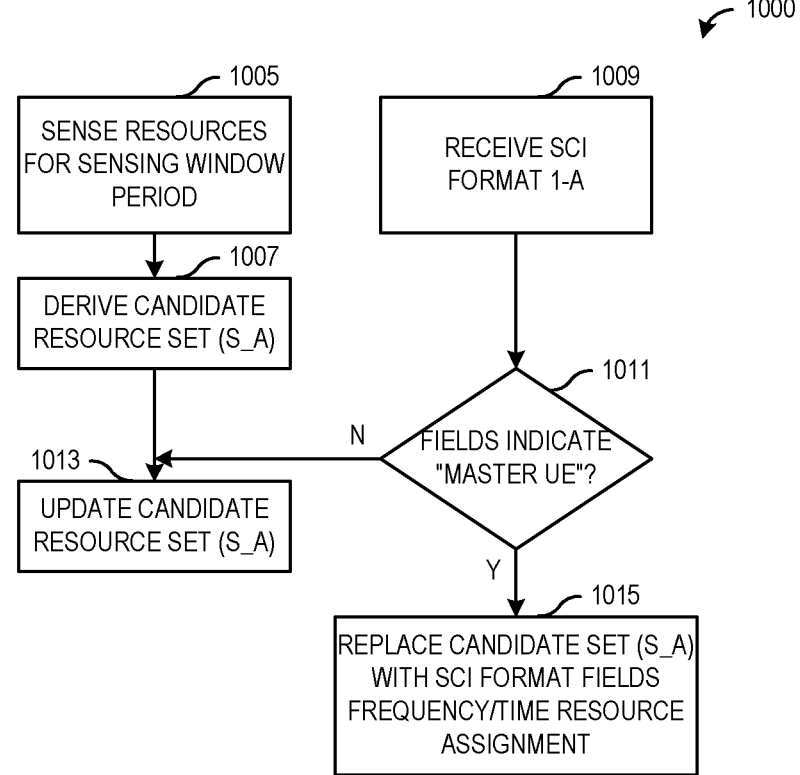
FIG. 10 illustrates a flow diagram of example operations occurring in a UE-B performing sensing and receiving resource information according to example embodiments presented herein.

FIG. 10 illustrates a flow diagram of example operations 1000 occurring in a UE-B performing sensing and receiving resource information. Operations 1000 may be indicative of operations occurring in a UE-B as the UE-B performs sensing and receives resource information.

Operations 1000 begin with the UE-B sensing resources (block 1005). The UE-B senses resources for a duration of a sensing window or one or more portions of a sensing window as described previously. The UE-B may detect energy levels associated with the resources, for example. If a resource has a high energy level, the UE-B may determine that there is a transmission occurring in the resource and that the resource is unavailable. The UE-B derives a candidate resource set S_A (block 1007). The candidate resource set S_A may be determined in accordance with the sensing, as well as previously available candidate resource sets.

As an illustrative example, the following procedure may be used to determine the candidate resource set S_A. A candidate resource for transmission Rx,y is defined by L_CH. The total number of candidate resources is denoted M total. After the sensing window and a set of minimum threshold RSRP measurements, the candidate resource set S_A comprises a set of all candidate resources formed with RSRP measurements less than a minimum threshold.

The UE-B receives a SCI format 1-A message (block 1009). The UE-B performs a check to determine if the SCI format 1-A message is from a master UE (block ion). If the SCI fields or priority fields of the SCI format 1-A message includes an indicator indicating a master UE or a high priority, then the SCI format 1-A message is from a master UE, for example. If the SCI format 1-A message is not from a master UE, the UE-B updates the candidate resource set S_A with resource information included in the SCI format 1-A message (block 1013). As an example, the UE-B may apply a weight to the resource information included in the SCI format 1-A message prior to combining the resource information with the information in the candidate resource set S_A. If the SCI format 1-A message is from a master UE, the UE-B replaces the candidate resource set S_A with resource information included in the SCI format 1-A message (block 1015).

Some UE-Bs, such as pedestrian UEs, do not have to sense for sidelink transmissions (i.e., these UE-Bs may skip block 1005). In such a situation, these UE-Bs may simply use the resource information included in the SCI format 1-A message (independent of whether or not the SCI format 1-A message is from a master UE) to replace the candidate resource set S_A. These UE-Bs use the resource information in the candidate resource set S_A for sidelink communication.

The UE-B may exclude any candidate resource from the candidate resource set S_A based on the information received in the SCI format 1-A message and selection criterion, such as weighting factors, and so on. If the SCI format 1-A message is from a master UE, the UE-B resets the candidate resource set S_A according to the SCI format 1-A frequency resource assignment and time resource assignment, similar to a mode-1 grant.

In an embodiment, the UE-B combines the candidate resource set S_A with resource information included in the SCI format 1-A message.

In an embodiment, the UE-B reports the candidate resource set S_A (as updated) to higher layers within the UE.

The information that UE-B provides may include: 1) resources to avoid, or 2) resources to use or preferentially use, where the resources and their usage may be determined to a traffic or packet priority level or the relative or absolute hierarchy of the UE-B.

In an embodiment, in a situation when a UE-B receives multiple SCI format 1-A messages from several UE-As (including master UEs), the UE-B assigns weights to the different UE-A based on a metric, such as a signal strength metric (e.g., L1-RSRP, S-SSB, and so on), for example. The UE-B derives a new candidate resource set S_A based on the originating source (first master UEs and then other UE-As). The SCI format 1-A message from master UEs would have the highest priority, for example.

In an embodiment, when updating the candidate resource set S_A, the UE-B may:

Take the resource information as being mandatory.

View the resource information as being informational only and may or may not take the resource information into consideration when updating the candidate resource set S_A. In other words, the resource information is viewed as suggestions or wish list information only.

Take action based on traffic priority. As an example, for low traffic priority, the resource information is viewed as mandatory, while for high traffic priority, the resource information is viewed as being informational only.

Take action based on UE hierarchy. As an example, if the UE-B and the source UE-A of the SCI format 1-A are both master UEs, the UE-B views the resource information as being informational only.

Other potential rules for updating the candidate resource set S_A may be expressed as follows:

If the source UE-A is a master UE and if UE-B is not a master UE, then UE-B uses the resource information in the SCI format 1-A message.

If both the source UE-A and UE-B are of the same hierarchical rank (e.g., master UEs), then If the source UE-A indicates traffic of higher priority than UE-B, then UE-B uses the resource information in the SCI format 1-A message.

If UE-B indicates traffic of lower priority than the source UE-A does, then UE-B ignores the candidate resource set S_A of UE-B (or uses them as informational only, avoids using the resources if possible, and so on).

In an embodiment, if the source UE-A and UE-B have traffic with the same priority level, the implementation of UE-B is allowed to select how to consider the resource information provided by the source UE-A.

In an embodiment, the timing of the updates to the candidate resource set S_A and the frequency of the updates are based on the SCI format 1-A message and the time resource assignment field therein. As an example, the UE-B may be configured to always follow the instruction of the master UE. As another example, the UE-B may be configured to behave according to priority rules. As yet another example, the UE may be configured to consider the reservation field as only indicating preferences, not mandatory requirements.

Figures 11, 12:
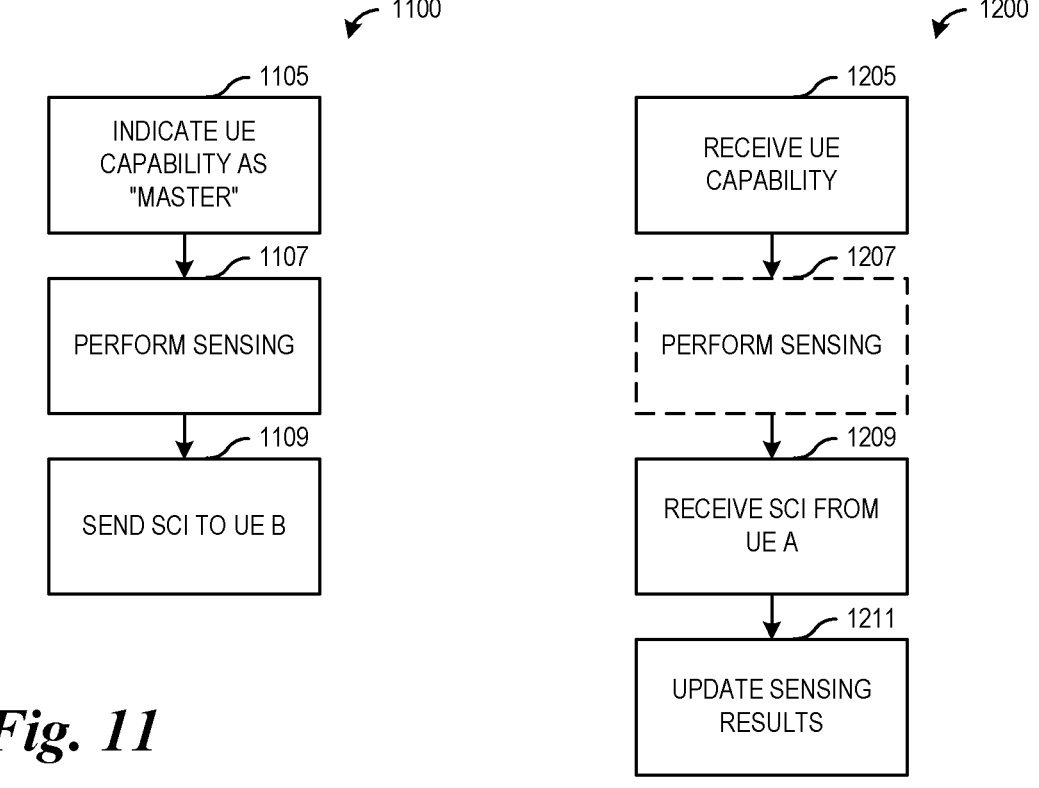
FIG. 11 illustrates a flow diagram of example operations occurring in a UE-A according to example embodiments presented herein.
FIG. 12 illustrates a flow diagram of example operations occurring in a UE-B according to example embodiments presented herein.

FIG. 11 illustrates a flow diagram of example operations 1100 occurring in a UE-A. Operations 1100 may be indicative of operations occurring in a UE-A.

Operations 1100 begin with the UE-A setting an indicator indicating that the UE-A is a master UE (block 1105). The indicator may be a bit in a SCI format 1-A message that, when set to a first value, indicates that the UE-A is a master UE, and when set to a second value, indicates that the UE-A is not a master UE. The UE-A performs sensing (block 1107). The UE-A senses resources in for a duration of a sensing window or one or more portions of a sensing window as described previously. The UE-A may detect energy levels associated with the resources, for example. If a resource has a high energy level, the UE-A may determine that there is a transmission occurring in the resource and that the resource is unavailable. The UE-A sends a SCI message to a UE-B (block 1109). The SCI message may be a SCI format 1-A or a SCI format 2-A or 2-B message, for example. Resource information, based on results of the sensing, may also be included in the SCI message.

FIG. 12 illustrates a flow diagram of example operations 1200 occurring in a UE-B. Operations 1200 may be indicative of operations occurring in a UE-B.

Operations 1200 begin with the UE-B receiving UE capability information (block 1205). As discussed previously, UE capability information specifies the capability of UE-A, which may include whether or not the UE-A is a master UE, time sensing information, directional information, UE-specific or direction resource information, and so on. The UE capability information may be received from the gNB, the UE capability information may be exchanged using sidelink radio resource control (RRC) signaling, the UE capability information may be pre-configured (this may be particularly useful in some situations, such as public safety deployments), the UE capability information may be may be exchanged using SCI signaling, and so on.

The UE capability information may be traffic dependent. As an example, in the case of a public safety deployment, the UE capability information may apply to one type of traffic priority level (e.g., mission critical traffic priority level) but not to another. There may be several ways to address this dependency, such as the UE capability may include an indicator indicating to which traffic priority level it applies, or the traffic priority level to which the UE capability applies may be signaled in the SCI (as described below).

The UE-B may perform sensing (block 1207). The UE-B senses resources in for a duration of a sensing window or one or more portions of a sensing window as described previously. The UE-B may detect energy levels associated with the resources, for example. If a resource has a high energy level, the UE-B may determine that there is a transmission occurring in the resource and that the resource is unavailable. The sensing performed by the UE-B may be optional. As an example, sensing may be performed if the UE-B is operating using resource allocation mode-1.

The UE-B receives a SCI message from the UE-A (block 1209). The SCI message may be a SCI format 1-A message or a SCI format 2-A or 2-B message. As discussed previously, the SCI message includes resource information about resources that the UE-A marks for its own usage or its group's usage.

The UE-B updates its sensing results (block 1211). The UE-B updates its candidate resource set S_A in accordance with the resource information received in the SCI message. The UE-B may update the candidate resource set S_A using any of the techniques described above, for example. The UE-B may even consider the resource information received in the SCI message informational only.

$$\left\lceil \log_2 \left( \frac{N_{subChannel}^{SL}\left(N_{subChannel}^{SL}+1\right)}{2} \right) \right\rceil$$

-continued $$\left\lceil \log_2 \left( \frac{N_{subChannel}^{SL}\left(N_{subChannel}^{SL}+1\right)\left(2N_{subChannel}^{SL}+1\right)}{6} \right) \right\rceil \left\lceil \log_2\left(N_{reservPeriod}\right) \right\rceil$$

In an embodiment, the SCI format 1-A message may be modified as follows to indicate reserved resources for UE coordination.

$$\left\lceil \log_2 \left( \frac{N_{subChannel}^{SL}\left(N_{subChannel}^{SL}+1\right)}{2} \right) \right\rceil$$

$$\left\lceil \log_2 \left( \frac{N_{subChannel}^{SL}\left(N_{subChannel}^{SL}+1\right)\left(2N_{subChannel}^{SL}+1\right)}{6} \right) \right\rceil \left\lceil \log_2\left(N_{reservPeriod}\right) \right\rceil$$

Priority— 3 bits. This field can be used to indicate the minimum priority level for which the resource reserved by UE A;

$$\left\lceil \log_2 \left( \frac{N_{subChannel}^{SL}\left(N_{subChannel}^{SL}+1\right)}{2} \right) \right\rceil$$

$$\left\lceil \log_2 \left( \frac{N_{subChannel}^{SL}\left(N_{subChannel}^{SL}+1\right)\left(2N_{subChannel}^{SL}+1\right)}{6} \right) \right\rceil \left\lceil \log_2\left(N_{reservPeriod}\right) \right\rceil$$

Frequency resource assignment—bits when the value of the higher layer parameter sl-MaxNumPerReserve is configured to 2; otherwise bits when the value of the higher layer parameter sl-MaxNumPerReserve is configured to 3, as defined in TS 38.214. This field indicates the frequency resources reserved by UE A for UE coordination;

$$\left\lceil \log_2 \left( \frac{N_{subChannel}^{SL}\left(N_{subChannel}^{SL}+1\right)}{2} \right) \right\rceil$$

$$\left\lceil \log_2 \left( \frac{N_{subChannel}^{SL}\left(N_{subChannel}^{SL}+1\right)\left(2N_{subChannel}^{SL}+1\right)}{6} \right) \right\rceil \left\lceil \log_2\left(N_{reservPeriod}\right) \right\rceil$$

Time resource assignment—X bits. This indicates the time pattern of the reserved resources. It could be 5 or 9 bits, just like for regular format 1-A It could also be of a different format to indicate longer time reservations. In particular, one value could be used to indicate infinite resource reservation;

$$\left\lceil \log_2 \left( \frac{N_{subChannel}^{SL}\left(N_{subChannel}^{SL}+1\right)}{2} \right) \right\rceil$$

$$\left\lceil \log_2 \left( \frac{N_{subChannel}^{SL}\left(N_{subChannel}^{SL}+1\right)\left(2N_{subChannel}^{SL}+1\right)}{6} \right) \right\rceil \left\lceil \log_2\left(N_{reservPeriod}\right) \right\rceil$$

Resource reservation period—bits as defined in TS 38.214, if higher parameter sl-MultiReserveResource is configured; 0 bit otherwise. This field can be reused as is, although a different parameter than sl-MultiReserveResource could be used;

$$\left\lceil \log_2 \left( \frac{N_{subChannel}^{SL}\left(N_{subChannel}^{SL}+1\right)}{2} \right) \right\rceil$$

-continued $$\left\lceil \log_2\left(\frac{N_{subChannel}^{SL}\left(N_{subChannel}^{SL}+1\right)\left(2N_{subChannel}^{SL}+1\right)}{6}\right)\right\rceil\left\lceil \log_2(N_{reservPeriod})\right\rceil$$

DMRS pattern— [x] bits as defined in clause 8.4.1.1.2 of TS 38.211, if more than one DMRS patterns are configured by higher layer parameter sl-PSSCH-DMRS-TimePattern; 0 bit otherwise. This field of SCI format 1-A could be omitted;

$$\left\lceil \log_2\left(\frac{N_{subChannel}^{SL}\left(N_{subChannel}^{SL}+1\right)}{2}\right)\right\rceil$$

$$\left\lceil \log_2\left(\frac{N_{subChannel}^{SL}\left(N_{subChannel}^{SL}+1\right)\left(2N_{subChannel}^{SL}+1\right)}{6}\right)\right\rceil\left\lceil \log_2(N_{reservPeriod})\right\rceil$$

2nd-stage SCI format—[x] bits as defined in TS 38.214. Only present if a second stage SCI (SCI format 2-A or 2-B) is present;

$$\left\lceil \log_2\left(\frac{N_{subChannel}^{SL}\left(N_{subChannel}^{SL}+1\right)}{2}\right)\right\rceil$$

$$\left\lceil \log_2\left(\frac{N_{subChannel}^{SL}\left(N_{subChannel}^{SL}+1\right)\left(2N_{subChannel}^{SL}+1\right)}{6}\right)\right\rceil\left\lceil \log_2(N_{reservPeriod})\right\rceil$$

Beta_offset indicator—[2] bits as provided by higher layer parameter sl-BetaOffsets2ndSCI. Only present if a second stage SCI (SCI format 2-A or 2-B) is present;

$$\left\lceil \log_2\left(\frac{N_{subChannel}^{SL}\left(N_{subChannel}^{SL}+1\right)}{2}\right)\right\rceil$$

$$\left\lceil \log_2\left(\frac{N_{subChannel}^{SL}\left(N_{subChannel}^{SL}+1\right)\left(2N_{subChannel}^{SL}+1\right)}{6}\right)\right\rceil\left\lceil \log_2(N_{reservPeriod})\right\rceil$$

Number of DMRS port—1 bit as defined in Table 8.3.1.1-1 of TS 38.213, version 16.2.0. This field of SCI format 1-A could be omitted; and $$\left\lceil \log_2\left(\frac{N_{subChannel}^{SL}\left(N_{subChannel}^{SL}+1\right)}{2}\right)\right\rceil$$

$$\left\lceil \log_2\left(\frac{N_{subChannel}^{SL}\left(N_{subChannel}^{SL}+1\right)\left(2N_{subChannel}^{SL}+1\right)}{6}\right)\right\rceil\left\lceil \log_2(N_{reservPeriod})\right\rceil$$

Modulation and coding scheme—$_5$ bits as defined in clause 8.1.3 of TS 38.214. Only present if a second stage SCI (SCI format 2-A or 2-B) is present.

In an embodiment, the SCI format 1-A message could be sent as a standalone SCI message or a second-stage SCI message may be added to carry more information. For instance, it could indicate to which group of UEs it applies to, or the geographical location for which the restrictions apply. For instance, the SCI format 1-A message could indicate a threshold (in terms of SL RSRP, signal plus interference to noise ratio (SINR), received signal strength indicator (RSSI), etc.). UEs that receive the SCI format 1-A message with a power (or RSRP, etc.) larger than a threshold would have to avoid the resources signaled in the SCI format 1-A message, whereas the UEs receiving the SCI format 1-A message with a power below the threshold could still use the resources signaled in the SCI format 1-A message. This is somewhat similar to the sensing procedure with priority levels, where a resource is deemed usable based on a SL RSRP threshold dependent on the priority level.

The UE-B needs to know that the SCI message indicates resources for UE coordination purposes. There may be several ways to achieve this:

A bit from the SCI format 1-A message may be used to indicate that the UE-A is a master UE. As an example, one of the reserved bits may be used as such an indicator.

The SCI message may be sent in a search space or control resource set (CORESET) dedicated for such a purpose. The UE-B knows that any control message sent on that search space is to indicate UE coordination resources. The control message may need to be a standalone message (in other words, without any associated PSSCH).

If the control message contains only the first stage SCI (the SCI format 1-A message) and there is no second stage SCI (the SCI format 2-A or 2-B message), the fields used for the second stage SCI (e.g., the 2nd-stage SCI format, the beta offset indicator, or the modulation and coding scheme fields) may be remapped to indicate if the UE-A is a master UE or its rank.

If the control message contains both first and second stage SCI messages, the master UE indication may be included in the second stage SCI message. Alternatively, the master UE indication may be included in the first stage SCI message with one or more of the reserved bits being used as the master UE indication. Alternatively, some fields may be remapped. If there is only the second stage SCI message but no PSSCH, the number of DMRS ports could be fixed. Therefore, the bit used for the DMRS port may be used as the master UE indication. Similarly, the DMRS pattern field may be remapped and a pre-defined pattern may be used for the second stage SCI message when there is no associated PSSCH.

In addition, the first stage SCI message may indicate a source ID or an ID linked to the source ID, as defined in 3GPP Release-16. Then, based on the source ID, the UE-B can determine the rank of the UE-A. This technique requires having obtained a (pre-) configuration to link the source ID. That should not be a problem, at least for some scenarios (e.g., public safety). Alternatively, the UE-A may also only send its rank instead of its full ID, using, e.g., the reserved bits or remapped fields. The source ID may then not be sent at all, or the source ID may be indicated in the second stage SCI message (if present).

An advantage of sending a first stage SCI message may be that any UE can receive and decode the first stage SCI message. Thus, it is very useful in situations where the resource restrictions apply to all the UEs, e.g., in a public safety scenario. However, there are situations where the restrictions should apply only to one UE, or to a subset of UEs. In these situations, the message structure described above may also apply, in conjunction with a second stage SCI message indicating to which UEs the reservation or restrictions apply. When a second stage SCI message is needed, it is likely that a new second stage SCI message format is needed.

In situations when the reservations or restrictions apply to only one UE or a limited group of UEs, it may be beneficial to use a format that relies on SCI format 2-A or 2-B. The modified format, presented below, is described for unicast operation. Extensions to groupcast, multicast, and broadcast are straightforward.

When the second stage SCI message is used, a first stage SCI message (following the format described above, for example) is transmitted. Additionally, if the UE-B is to receive data, the resource allocation field may indicate the allocated resources for transmission. If there is no sidelink grant, these fields may be set to NULL or some other agreed upon value to indicate no value. The first stage SCI message includes an indicator of a new format for the second stage SCI message.

$$\left\lceil \log_2\left(\frac{N_{subChannel}^{SL}\left(N_{subChannel}^{SL}+1\right)}{2}\right)\right\rceil$$

$$\left\lceil \log_2\left(\frac{N_{subChannel}^{SL}\left(N_{subChannel}^{SL}+1\right)\left(2N_{subChannel}^{SL}+1\right)}{6}\right)\right\rceil\left\lceil \log_2(N_{reservPeriod})\right\rceil$$

In an embodiment, in addition to existing second stage SCI fields, the following fields may be added:

$$\left\lceil \log_2\left(\frac{N_{subChannel}^{SL}\left(N_{subChannel}^{SL}+1\right)}{2}\right)\right\rceil$$

$$\left\lceil \log_2\left(\frac{N_{subChannel}^{SL}\left(N_{subChannel}^{SL}+1\right)\left(2N_{subChannel}^{SL}+1\right)}{6}\right)\right\rceil\left\lceil \log_2(N_{reservPeriod})\right\rceil$$

Priority—3 bits. This field can be used to indicate the minimum priority level for which the resource reserved by the UE-A;

$$\left\lceil \log_2\left(\frac{N_{subChannel}^{SL}\left(N_{subChannel}^{SL}+1\right)}{2}\right)\right\rceil$$

$$\left\lceil \log_2\left(\frac{N_{subChannel}^{SL}\left(N_{subChannel}^{SL}+1\right)\left(2N_{subChannel}^{SL}+1\right)}{6}\right)\right\rceil\left\lceil \log_2(N_{reservPeriod})\right\rceil$$

Frequency resource assignment—bits when the value of the higher layer parameter sl-MaxNumPerReserve is configured to 2; otherwise bits when the value of the higher layer parameter sl-MaxNumPerReserve is configured to 3, as defined in TS 38.214. This field indicates the frequency resources reserved by the UE-A for UE coordination;

$$\left\lceil \log_2\left(\frac{N_{subChannel}^{SL}\left(N_{subChannel}^{SL}+1\right)}{2}\right)\right\rceil$$

$$\left\lceil \log_2\left(\frac{N_{subChannel}^{SL}\left(N_{subChannel}^{SL}+1\right)\left(2N_{subChannel}^{SL}+1\right)}{6}\right)\right\rceil\left\lceil \log_2(N_{reservPeriod})\right\rceil$$

Time resource assignment—X bits. This indicates the time pattern of the reserved resources. It could be 5 or 9 bits, just like for regular SCI format 1-A. It could also be of a different format to indicate longer time reservations. As an example, one value could be used to indicate infinite resource reservation;

Resource reservation period—bits as defined in TS 38.214, if higher parameter sl-MultiReserveResource is configured; 0 bit otherwise. This field can be reused as is, although a parameter other than sl-MultiReserveResource could be used.

Furthermore, other fields may be added, such as a RSRP threshold used for UE coordination, a geographical range, and so on.

In the discussion presented above, some UE-As are referred to as being master UEs due to their enhanced capability. However, the example embodiments presented herein are also operable with UE-As that are differentiated based on their priority level. In such a situation, a UE-A would transmit SCI format 1-A messages with the highest priority as listed in the SCI format. Alternatively, one of the reserved bits of the SCI format 1-A message may be used to indicate the UE-A as a master UE.

Figure 13:
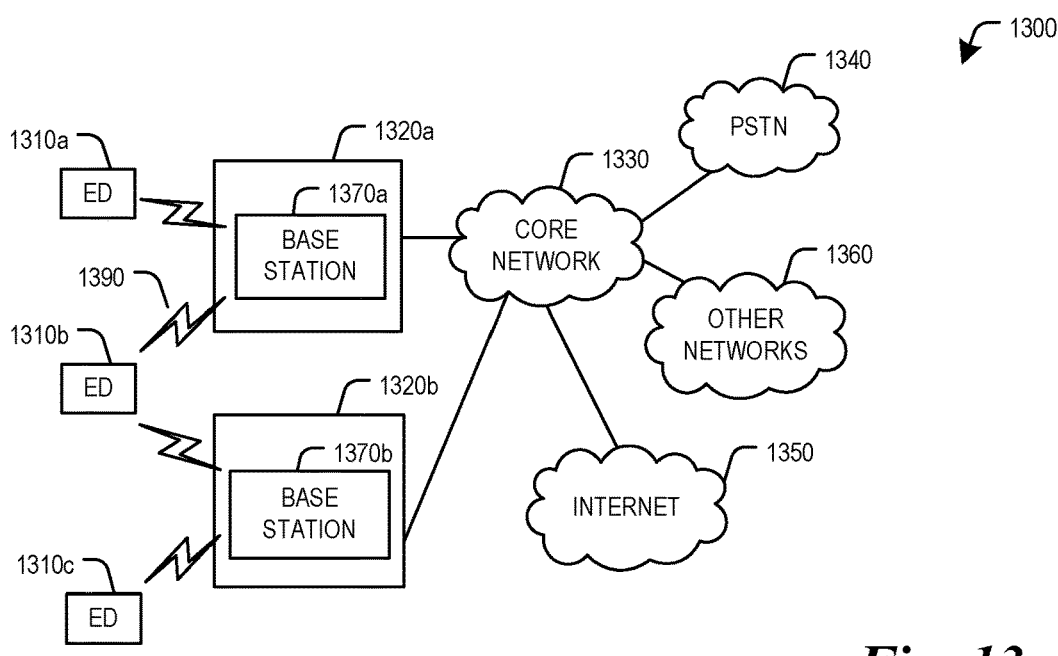
FIG. 13 illustrates an example communication system according to example embodiments presented herein.

FIG. 13 illustrates an example communication system 1300. In general, the system 1300 enables multiple wireless or wired users to transmit and receive data and other content. The system 1300 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1300 includes electronic devices (ED) 1310a-1310c, radio access networks (RANs) 1320a-1320b, a core network 1330, a public switched telephone network (PSTN) 1340, the Internet 1350, and other networks 1360. While certain numbers of these components or elements are shown in FIG. 13, any number of these components or elements may be included in the system 1300.

The EDs 1310a-1310c are configured to operate or communicate in the system 1300. For example, the EDs 1310a-1310c are configured to transmit or receive via wireless or wired communication channels. Each ED 1310a-1310c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1320a-1320b here include base stations 1370a-1370b, respectively. Each base station 1370a-1370b is configured to wirelessly interface with one or more of the EDs 1310a-1310c to enable access to the core network 1330, the PSTN 1340, the Internet 1350, or the other networks 1360. For example, the base stations 1370a-1370b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1310a-1310c are configured to interface and communicate with the Internet 1350 and may access the core network 1330, the PSTN 1340, or the other networks 1360.

In the embodiment shown in FIG. 13, the base station 1370*a* forms part of the RAN 1320*a*, which may include other base stations, elements, or devices. Also, the base station 1370*b* forms part of the RAN 1320*b*, which may include other base stations, elements, or devices. Each base station 1370*a*-1370*b* operates to transmit or receive wireless signals within a particular geographic region or area, sometimes referred to as a "cell." In some embodiments, multiple-input multiple-output (MIMO) technology may be employed having multiple transceivers for each cell.

The base stations 1370*a*-1370*b* communicate with one or more of the EDs 1310*a*-1310*c* over one or more air interfaces 1390 using wireless communication links. The air interfaces 1390 may utilize any suitable radio access technology.

It is contemplated that the system 1300 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1320*a*-1320*b* are in communication with the core network 1330 to provide the EDs 1310*a*-1310*c* with voice, data, application, Voice over Internet Protocol (VoIP), or other services. Understandably, the RANs 1320*a*-1320*b* or the core network 1330 may be in direct or indirect communication with one or more other RANs (not shown). The core network 1330 may also serve as a gateway access for other networks (such as the PSTN 1340, the Internet 1350, and the other networks 1360). In addition, some or all of the EDs 1310*a*-1310*c* may include functionality for communicating with different wireless networks over different wireless links using different wireless technologies or protocols. Instead of wireless communication (or in addition thereto), the EDs may communicate via wired communication channels to a service provider or switch (not shown), and to the Internet 1350.

Although FIG. 13 illustrates one example of a communication system, various changes may be made to FIG. 13. For example, the communication system 1300 could include any number of EDs, base stations, networks, or other components in any suitable configuration.

Figure 14A:
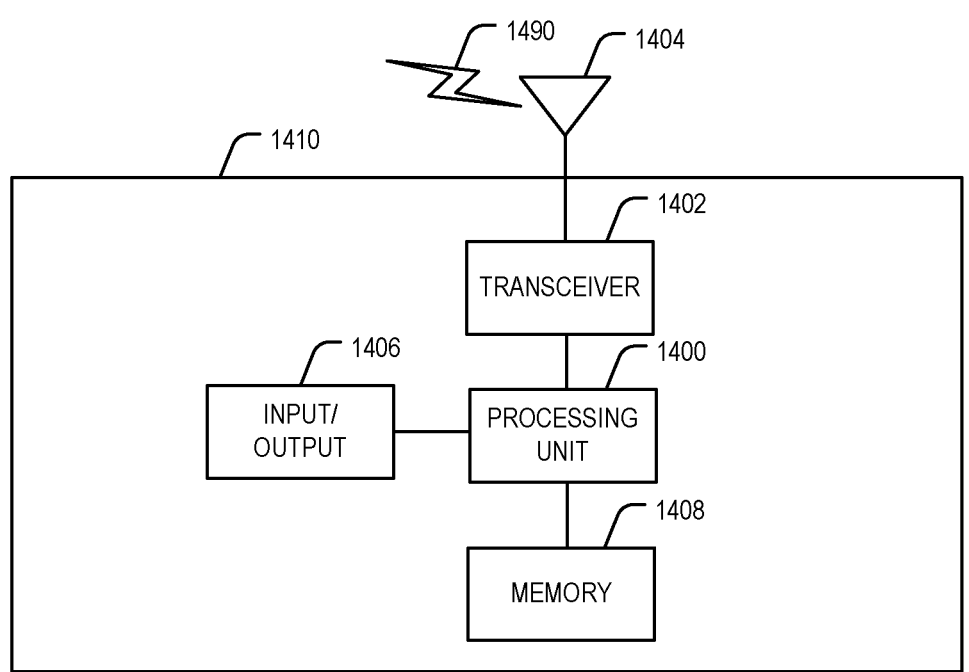
FIGS. 14A and 14B illustrate example devices that may implement the methods and teachings according to this disclosure.
Figure 14B:
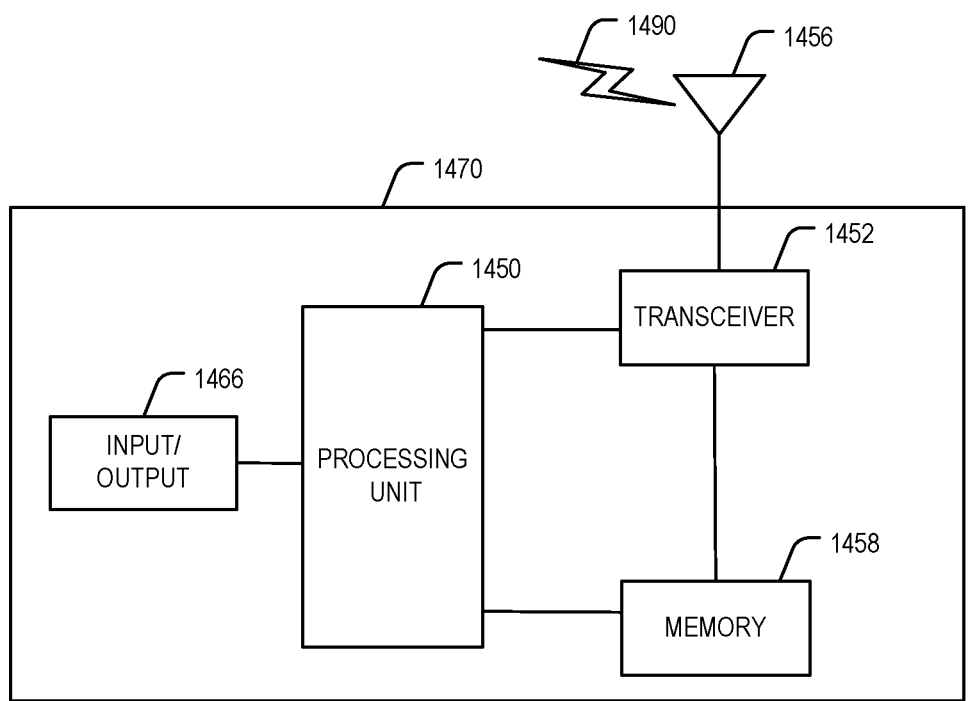

FIGS. 14A and 14B illustrate example devices that may implement the methods and teachings according to this disclosure. In particular, FIG. 14A illustrates an example ED 1410, and FIG. 14B illustrates an example base station 1470. These components could be used in the system 1300 or in any other suitable system.

As shown in FIG. 14A, the ED 1410 includes at least one processing unit 1400. The processing unit 1400 implements various processing operations of the ED 1410. For example, the processing unit 1400 could perform signal coding, data processing, power control, input/output processing, or any other functionality enabling the ED 1410 to operate in the system 1300. The processing unit 1400 also supports the methods and teachings described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1410 also includes at least one transceiver 1402. The transceiver 1402 is configured to modulate data or other content for transmission by at least one antenna or NIC (Network Interface Controller) 1404. The transceiver 1402 is also configured to demodulate data or other content received by the at least one antenna 1404. Each transceiver 1402 includes any suitable structure for generating signals for wireless or wired transmission or processing signals received wirelessly or by wire. Each antenna 1404 includes any suitable structure for transmitting or receiving wireless or wired signals. One or multiple transceivers 1402 could be used in the ED 1410, and one or multiple antennas 1404 could be used in the ED 1410. Although shown as a single functional unit, a transceiver 1402 could also be implemented using at least one transmitter and at least one separate receiver.

The ED 1410 further includes one or more input/output devices 1406 or interfaces (such as a wired interface to the Internet 1350). The input/output devices 1406 facilitate interaction with a user or other devices (network communications) in the network. Each input/output device 1406 includes any suitable structure for providing information to or receiving information from a user, such as a speaker, microphone, keypad, keyboard, display, or touch screen, including network interface communications.

In addition, the ED 1410 includes at least one memory 1408. The memory 1408 stores instructions and data used, generated, or collected by the ED 1410. For example, the memory 1408 could store software or firmware instructions executed by the processing unit(s) 1400 and data used to reduce or eliminate interference in incoming signals. Each memory 1408 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 14B, the base station 1470 includes at least one processing unit 1450, at least one transceiver 1452, which includes functionality for a transmitter and a receiver, one or more antennas 1456, at least one memory 1458, and one or more input/output devices or interfaces 1466. A scheduler, which would be understood by one skilled in the art, is coupled to the processing unit 1450. The scheduler could be included within or operated separately from the base station 1470. The processing unit 1450 implements various processing operations of the base station 1470, such as signal coding, data processing, power control, input/output processing, or any other functionality. The processing unit 1450 can also support the methods and teachings described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transceiver 1452 includes any suitable structure for generating signals for wireless or wired transmission to one or more EDs or other devices. Each transceiver 1452 further includes any suitable structure for processing signals received wirelessly or by wire from one or more EDs or other devices. Although shown combined as a transceiver 1452, a transmitter and a receiver could be separate components. Each antenna 1456 includes any suitable structure for transmitting or receiving wireless or wired signals. While a common antenna 1456 is shown here as being coupled to the transceiver 1452, one or more antennas 1456 could be coupled to the transceiver(s) 1452, allowing separate antennas 1456 to be coupled to the transmitter and the receiver if equipped as separate components. Each memory 1458 includes any suitable volatile or non-volatile storage and retrieval device(s). Each input/output device 1466 facilitates interaction with a user or other devices (network communications) in the network. Each input/output device 1466 includes any suitable structure for providing information to or receiving/providing information from a user, including network interface communications.

Figure 15:
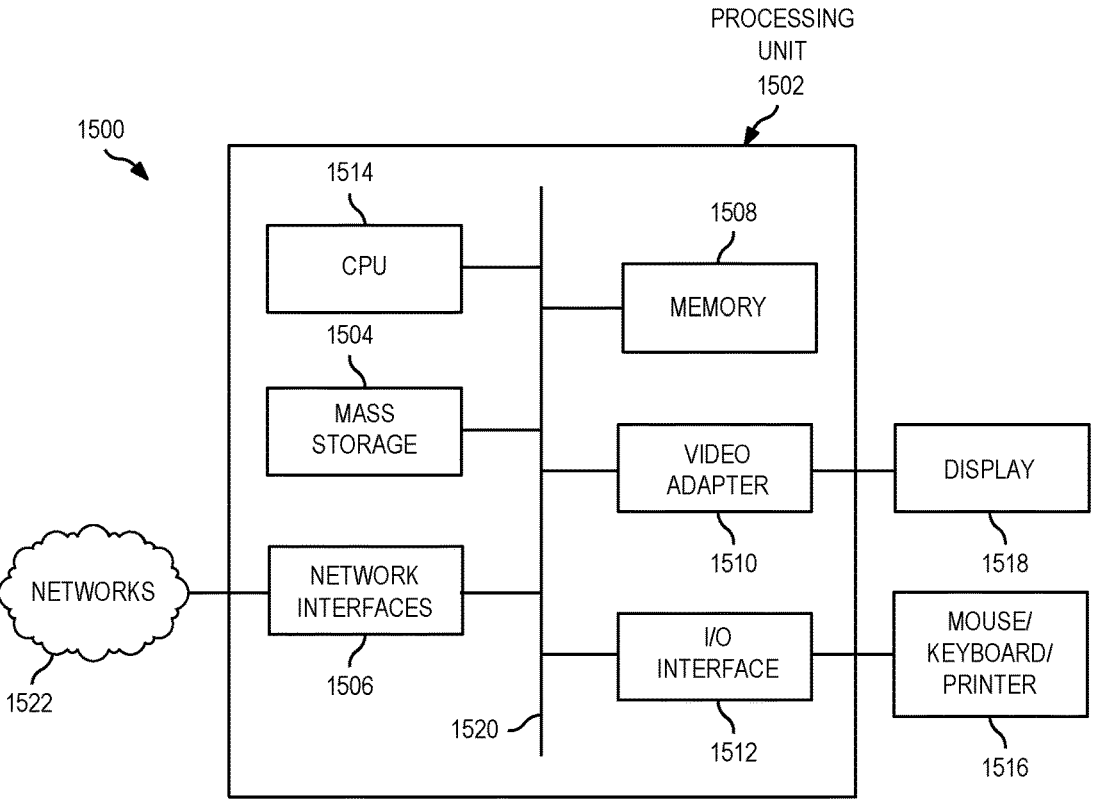
FIG. 15 is a block diagram of a computing system that may be used for implementing the devices and methods disclosed herein.

FIG. 15 is a block diagram of a computing system 1500 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1500 includes a processing unit 1502. The processing unit includes a central processing unit (CPU) 1514, memory 1508, and may further include a mass storage device 1504, a video adapter 1510, and an I/O interface 1512 connected to a bus 1520.

The bus 1520 may be one or more of any type of several bus architectures including a memory bus or memory controller, a peripheral bus, or a video bus. The CPU 1514 may comprise any type of electronic data processor. The memory 1508 may comprise any type of non-transitory system memory such as static random access memory (SRAM), dynamic random access memory (DRAM), synchronous DRAM (SDRAM), read-only memory (ROM), or a combination thereof. In an embodiment, the memory 1508 may include ROM for use at boot-up, and DRAM for program and data storage for use while executing programs.

The mass storage 1504 may comprise any type of non-transitory storage device configured to store data, programs, and other information and to make the data, programs, and other information accessible via the bus 1520. The mass storage 1504 may comprise, for example, one or more of a solid state drive, hard disk drive, a magnetic disk drive, or an optical disk drive.

The video adapter 1510 and the I/O interface 1512 provide interfaces to couple external input and output devices to the processing unit 1502. As illustrated, examples of input and output devices include a display 1518 coupled to the video adapter 1510 and a mouse, keyboard, or printer 1516 coupled to the I/O interface 1512. Other devices may be coupled to the processing unit 1502, and additional or fewer interface cards may be utilized. For example, a serial interface such as Universal Serial Bus (USB) (not shown) may be used to provide an interface for an external device.

The processing unit 1502 also includes one or more network interfaces 1506, which may comprise wired links, such as an Ethernet cable, or wireless links to access nodes or different networks. The network interfaces 1506 allow the processing unit 1502 to communicate with remote units via the networks. For example, the network interfaces 1506 may provide wireless communication via one or more transmitters/transmit antennas and one or more receivers/receive antennas. In an embodiment, the processing unit 1502 is coupled to a local-area network 1522 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a sensing unit or module, a determining unit or module, or an updating unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:

sensing, by a first communication device, availability of transmission resources;

determining, by the first communication device, a first candidate sidelink resource set in accordance with the availability of the transmission resources; and transmitting, by the first communication device, to a second communication device, a sidelink control information (SCI) message comprising a priority indicator indicating a priority associated with the first candidate sidelink resource set and time resource assignments of the first candidate sidelink resource set, the time resource assignments indicating resources reserved by the first communication device for updating a second candidate sidelink resource set of the second communication device, the SCI message further comprising a resource type indicator indicating whether the first candidate sidelink resource set is preferred resources or not.

2. The method of claim 1, the priority indicating that the first communication device has a priority level above a predetermined threshold.

3. The method of claim 1, the SCI message further comprising a reservation periodicity indicator indicating a reservation periodicity of the first candidate sidelink resource set.

4. The method of claim 1, the priority indicator indicating a minimum priority level among candidate priority levels for the first candidate sidelink resource set.

5. The method of claim 1, further comprising:

transmitting, by the first communication device, to the second communication device, a capability indicator indicating capabilities of the first communication device.

6. The method of claim 5, the capability indicator being transmitted in at least one of a radio resource control (RRC) message, or the SCI message.

7. The method of claim 5, the capability indicator further comprising a traffic priority level indicator indicating a traffic priority level to which capabilities of the second communication device apply.

8. A method comprising:

sensing, by a first communication device, availability of transmission resources;

determining, by the first communication device, a first candidate sidelink resource set in accordance with the availability of the transmission resources;

receiving, by the first communication device, from a second communication device, a sidelink control information (SCI) message comprising a first priority indicator indicating a first priority associated with a second candidate sidelink resource set and time resource assignments of the second candidate sidelink resource set, the SCI message further comprising a resource type indicator indicating whether the second candidate sidelink resource set is preferred resources or not; and updating, by the first communication device, the first candidate sidelink resource set in accordance with the second candidate sidelink resource set and the resource type indicator.

9. The method of claim 8, the SCI message further comprising a reservation periodicity indicator indicating a reservation periodicity of the second candidate sidelink resource set.

10. The method of claim 8, the first priority indicator indicating a minimum priority level among candidate priority levels for the second candidate sidelink resource set.

11. The method of claim 8, the time resource assignments of the second candidate sidelink resource set comprising resources reserved by the first communication device for coordination.

12. The method of claim 8, further comprising:
determining, by the first communication device, a capability indicator indicating capabilities of the second communication device.

13. The method of claim 12, the determining the capability indicator comprising at least one of:
receiving the capability indicator from an access node,
receiving the capability indicator in a sidelink radio resource control (RRC) message,
retrieving the capability indicator preconfigured in a memory of the first communication device, or
receiving the capability indicator in the SCI message.

14. The method of claim 12, the capability indicator further comprising a traffic priority level indicator indicating a traffic priority level to which the capabilities of the second communication device apply.

15. The method of claim 12, the first priority being applied in accordance with at least one of a capability of the first communication device or a feature of the first communication device.

16. The method of claim 9, further comprising:
selecting, by the first communication device, resources from the updated first candidate sidelink resource set for sidelink communication.

17. The method of claim 16, further comprising:
transmitting, by the first communication device, data on the selected resources to the second communication device.

18. A first communication device comprising:
one or more processors; and
a non-transitory memory storage storing instructions that, when executed by the one or more processors, cause the first communication device to perform operations including:
sensing availability of transmission resources;
determining a first candidate sidelink resource set in accordance with the availability of the transmission resources; and
transmitting, to a second communication device, a sidelink control information (SCI) message comprising a priority indicator indicating a priority associated with the first candidate sidelink resource set and time resource assignments of the first candidate sidelink resource set, the time resource assignments comprising resources reserved by the first communication device for updating a second candidate sidelink resource set of the second communication device, the SCI message further comprising a resource type indicator indicating whether the first candidate sidelink resource set is preferred resources or not.

19. The first communication device of claim 18, the priority indicating that the first communication device has a priority level above a predetermined threshold.

20. The first communication device of claim 18, the SCI message further comprising a reservation periodicity indicator indicating a reservation periodicity of the first candidate sidelink resource set.

21. The first communication device of claim 18, the priority indicator indicating a minimum priority level among candidate priority levels for the first candidate sidelink resource set.

22. The first communication device of claim 18, the operations further comprising:
transmitting, to the second communication device, a capability indicator indicating capabilities of the first communication device.

23. The first communication device of claim 22, the capability indicator further comprising a traffic priority level indicator indicating a traffic priority level to which capabilities of the second communication device apply.

24. A first communication device comprising:
one or more processors; and
a non-transitory memory storage comprising instructions that, when executed by the one or more processors, cause the first communication device to perform operations including:
sensing availability of transmission resources;
determining a first candidate sidelink resource set in accordance with the availability of the transmission resources;
receiving, from a second communication device, a sidelink control information (SCI) message comprising a first priority indicator indicating a first priority associated with a second candidate sidelink resource set and time resource assignments of the second candidate sidelink resource set, the SCI message further comprising a resource type indicator indicating whether the second candidate sidelink resource set is preferred resources or not; and
updating the first candidate sidelink resource set in accordance with the second candidate sidelink resource set and the resource type indicator.

25. The first communication device of claim 24, the SCI message further comprising a reservation periodicity indicator indicating a reservation periodicity of the second candidate sidelink resource set.

26. The first communication device of claim 24, the first priority indicator indicating a minimum priority level among candidate priority levels for the second candidate sidelink resource set.

27. The first communication device of claim 24, the time resource assignments of the second candidate sidelink resource set comprising resources reserved by the first communication device for coordination.

28. The first communication device of claim 24, the operations further comprising:
determining a capability indicator indicating capabilities of the second communication device.

29. The first communication device of claim 28, the determining the capability indicator comprising at least one of:
receiving the capability indicator from an access node,
receiving the capability indicator in a sidelink radio resource control (RRC) message, retrieving the capability indicator preconfigured in a memory of the first communication device, or receiving the capability indicator in the SCI message.

30. The first communication device of claim 28, the capability indicator further comprising a traffic priority level indicator indicating a traffic priority level to which the capabilities of the second communication device apply.

31. The first communication device of claim 24, the operations further comprising:

selecting resources from the updated first candidate sidelink resource set for sidelink communication.

32. The first communication device of claim 31, the operations further comprising:

transmitting data on the selected resources to the second communication device.

\* \* \* \* \*